US006825964B2

United States Patent
Singh et al.

(10) Patent No.: US 6,825,964 B2
(45) Date of Patent: Nov. 30, 2004

(54) DEVICE FOR COUPLING DRIVE CIRCUITRY TO ELECTROABSORPTION MODULATOR

(75) Inventors: Prashant Singh, Eden Prairie, MN (US); Helga Foulk, Ambler, PA (US); Scott Redinger, Breinigsville, PA (US); Todd Tanji, Eagan, MN (US); Keith Maile, New Brighton, MN (US); John Stronczer, Minneapolis, MN (US)

(73) Assignees: T-Networks, Inc., Allentown, PA (US); AMCC, San Diego, CA (US)

( * ) Notice: Subject to any disclaimer, the term of this patent is extended or adjusted under 35 U.S.C. 154(b) by 0 days.

(21) Appl. No.: 10/277,290

(22) Filed: Oct. 22, 2002

(65) Prior Publication Data

US 2003/0090774 A1 May 15, 2003

Related U.S. Application Data

(60) Provisional application No. 60/348,179, filed on Oct. 23, 2001.

(51) Int. Cl.[7] .................... G02F 1/03; G02F 1/035; H01S 5/00
(52) U.S. Cl. .................. 359/248; 372/43; 385/2
(58) Field of Search .................. 359/248; 372/43, 372/50; 385/2

(56) References Cited

U.S. PATENT DOCUMENTS

2002/0054724 A1 * 5/2002 Tada et al. .................. 385/2

* cited by examiner

Primary Examiner—Georgia Epps
Assistant Examiner—William Choi
(74) Attorney, Agent, or Firm—RatnerPrestia

(57) ABSTRACT

Drive circuitry to provide a DC bias voltage and a high frequency modulation current to an electroabsorption modulator (EAM), including a high frequency modulation current source, a coupling capacitor, and a first DC lead. The drive circuitry may include termination circuitry. One lead of the high frequency modulation current source is electrically coupled to the first semiconductor type contact of the EAM and the other lead of the high frequency modulation current source is electrically coupled to an AC ground. The coupling capacitor includes a first electrode electrically coupled to the second semiconductor type contact of the EAM, a second electrode electrically coupled to the AC ground, and a dielectric layer between the electrodes. The first DC lead is electrically coupled to the EAM-side capacitor electrode and configured to be coupled to a first DC potential.

5 Claims, 21 Drawing Sheets

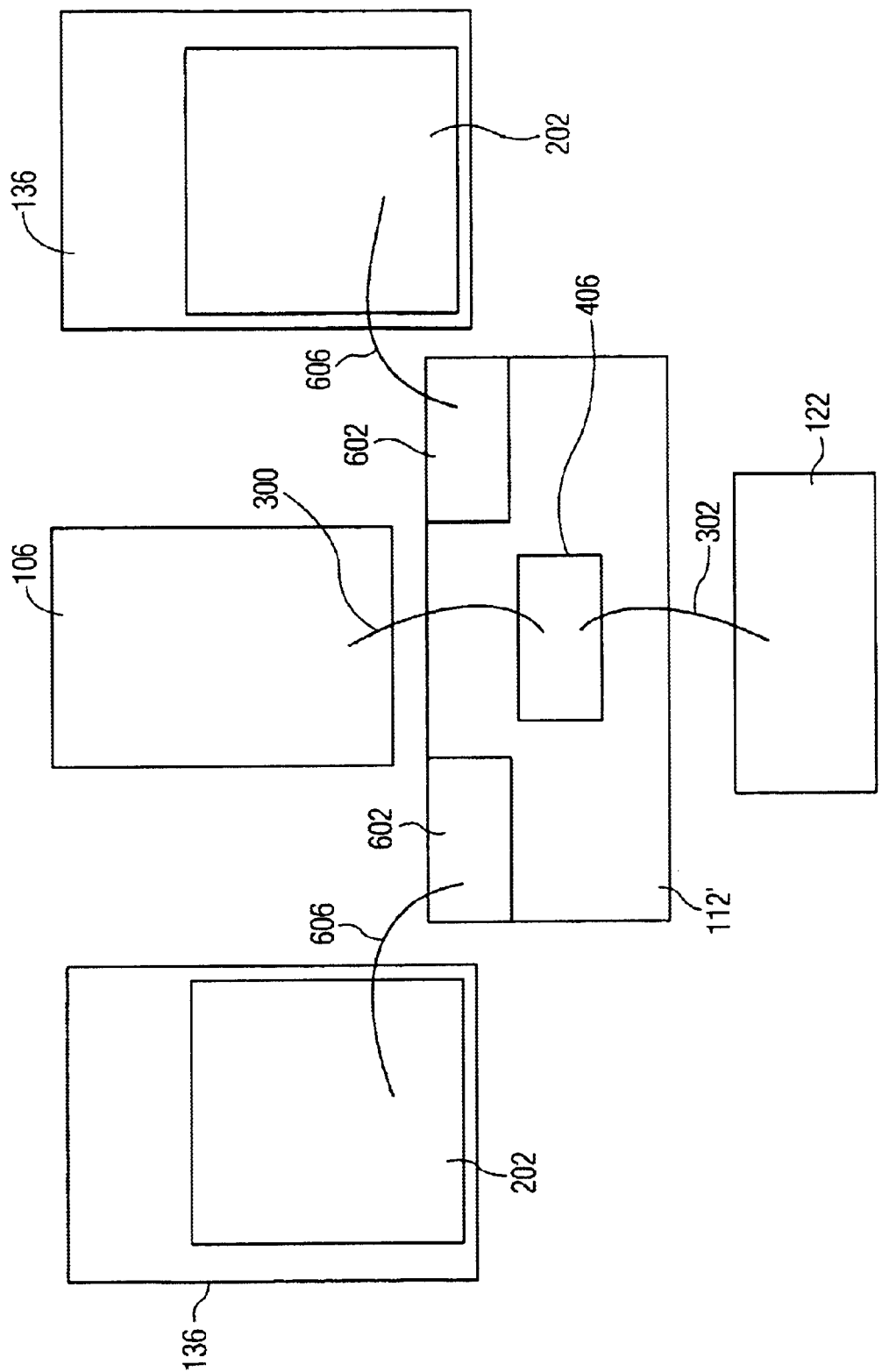

DEVICE FOR COUPLING DRIVE CIRCUITRY TO ELECTROABSORPTION MODULATOR

CROSS-REFERENCE TO RELATED APPLICATIONS

This application claims the benefit of U.S. Provisional Application No. 60/348,179, filed Oct. 23, 2001, the contents of which are incorporated herein by reference.

FIELD OF THE INVENTION

This invention is in the field of optoelectronic devices, and specifically relates to the coupling of driving signals to semiconductor devices for modulating optical signals.

BACKGROUND OF THE INVENTION

Semiconductor modulators for optical signals are extensively used in various applications, particularly in the field of telecommunications. One type of semiconductor modulator is an electroabsorption modulator (EAM). In order to operate an EAM, a variable voltage (RF signal) is provided across the terminals of the EAM. The voltage dependency of the absorption of the EAM at a selected operating wavelength results in a modulated optical signal. In practice it is often desirable for a DC bias voltage to be applied to the EAM as well. Adjustment of the DC bias voltage may allow tuning of the EAM performance and/or tuning of the operating wavelength of the EAM.

FIG. 1A illustrates a prior art EAM circuit employing DC coupled drive electronics represented by an RF source. Drive electronics 100 are represented as voltage source 102 coupled across a resistor 104. Drive electronics 100 are coupled to hybrid integrated circuit (HIC) assembly, or packaging, 106. HIC 106 is shown as a transmission line 108 and an inductor 110 to represent the connection between the transmission line 108 and EAM 112. EAM 112 is represented as resistor 114 and diode 116 in series, with a voltage controlled current source 118 representing the photocurrent, and pad capacitance 120 in parallel. Termination 122 includes a resistor 126, with an inductor 124 representing the connection to the EAM 112. The EAM has an n-type semiconductor side and a p-type semiconductor side. The n-side of EAM 112 is connected to a source of reference potential 136 (e.g. ground), while the p-side is coupled to the drive electronics through HIC 106. Any DC offset voltage provided to EAM 112 must be supplied by drive electronics 100. The need to provide the DC offset voltage may strain the drive electronics and lead to early component failure.

An alternative prior art circuit is shown with reference to FIG. 1B. In this circuit the n-side of the EAM is also connected to ground 136. This circuit employs a bias tee circuit 128 to connect drive electronics 100 to EAM 112. A DC bias to EAM 112 may be provided through bias tee circuit 128 by DC voltage supply 134. The use of bias tee circuit 128 in the circuit of FIG. 1B permits the DC offset voltage to be set with precision, and, compared to the prior art circuit shown in FIG. 1A, has less load on drive electronics 100. However, a suitable bias tee for high speed applications is relatively large, generally much larger than the EAM package itself, and adds significantly to the cost of a package incorporating drive electronics, the EAM, and other related electronics.

SUMMARY OF THE INVENTION

One embodiment of the present invention is drive circuitry to provide a DC bias voltage and a high frequency modulation current to an electroabsorption modulator (EAM), which includes a first semiconductor type contact and an second semiconductor type contact. The drive circuitry includes a high frequency modulation current source, a coupling capacitor, and a first DC lead. The first modulation lead of the high frequency modulation current source is electrically coupled to the first semiconductor type contact of the EAM and the second modulation lead of the high frequency modulation current source is electrically coupled to an AC ground. The coupling capacitor includes a EAM-side capacitor electrode which is electrically coupled to the second semiconductor type contact of the EAM, a non-EAM-side capacitor electrode which is electrically coupled to the AC ground, and a dielectric layer which is disposed between the EAM-side capacitor electrode and the non-EAM-side capacitor electrode. The first DC lead is electrically coupled to the EAM-side capacitor electrode and configured to be coupled to a first DC potential.

Another embodiment of the present invention is a monolithic EAM and coupling capacitor. The monolithic EAM and coupling capacitor include a substrate with a top surface. A non-EAM-side capacitor electrode is coupled to the top surface of the substrate, a capacitor dielectric layer is coupled to the non-EAM-side capacitor electrode and an EAM-side capacitor electrode is coupled to the capacitor dielectric layer to form the coupling capacitor. An EAM base layer is formed of a first type semiconductor material. This EAM base layer is electrically coupled to the EAM-side capacitor electrode. An EAM waveguide, which includes an electroabsorption portion, is formed on the EAM base layer. An EAM second type semiconductor layer is formed on the EAM waveguide and an EAM electrode is electrically coupled to the EAM second type semiconductor layer.

A further embodiment of the present invention is an alternative monolithic EAM and coupling capacitor. The alternative monolithic EAM and coupling capacitor includes a substrate formed of a first type semiconductor material with a top surface and a bottom surface. An EAM-side capacitor electrode is coupled to the bottom surface of the substrate, a capacitor dielectric layer is coupled to the EAM-side capacitor electrode and a non-EAM-side capacitor electrode is coupled to the capacitor dielectric layer to form the coupling capacitor. An EAM waveguide, which includes an electroabsorption portion, is formed on the top surface of the substrate. An EAM second type semiconductor layer is formed on the EAM waveguide and an EAM electrode is electrically coupled to the EAM second type semiconductor layer.

Yet another embodiment of the present invention is a method of manufacturing a monolithic EAM and coupling capacitor. A substrate formed of a first type semiconductor material with a top surface and a bottom surface is provided. An EAM waveguide layer, which includes an electroabsorption portion, is formed on the top surface of the substrate. An EAM second type semiconductor layer in formed on the EAM waveguide. The EAM second type semiconductor layer and the EAM waveguide layer are etched to form an EAM second type semiconductor region and an EAM waveguide. An EAM electrode is formed on the EAM second type semiconductor region. An EAM-side capacitor electrode is formed on the substrate. A capacitor dielectric layer, which is electrically coupled to the EAM-side capacitor electrode, is formed and a non-EAM-side capacitor electrode is formed on the capacitor dielectric layer.

A still further embodiment of the present invention is an additional monolithic EAM and coupling capacitor. The additional monolithic EAM and coupling capacitor includes a substrate, including a first type semiconductor material portion having a top surface. An EAM electrode is electrically coupled to the first type semiconductor material portion of the substrate. An EAM waveguide is formed on the top surface of the first type semiconductor material portion of the substrate and includes an electroabsorption portion. An EAM second type semiconductor layer is formed on the EAM waveguide. An EAM-side capacitor electrode is electrically coupled to the EAM second type semiconductor layer, a capacitor dielectric layer is formed on the EAM-side capacitor electrode, and a non-EAM-side capacitor electrode formed on the capacitor dielectric layer.

An additional embodiment of the present invention is an alternative method of manufacturing a monolithic EAM and coupling capacitor. A substrate including a first type semiconductor material portion having a top surface is provided. An EAM waveguide layer, which includes an electroabsorption portion, is formed on the top surface of the first type semiconductor material portion of the substrate. An EAM second type semiconductor layer is formed on the EAM waveguide layer. The EAM second type semiconductor layer and the EAM waveguide layer are etched to form an EAM second type semiconductor region and an EAM waveguide. An EAM electrode is formed on the first type semiconductor material portion of the substrate. An EAM-side capacitor electrode is formed on the EAM second type semiconductor region, a capacitor dielectric layer is formed on the EAM-side capacitor electrode, and a non-EAM-side capacitor electrode is formed on the capacitor dielectric layer.

Yet a further embodiment of the present invention is a method of manufacturing a monolithic co-sided EAM and coupling capacitor. A non-conducting substrate with a top surface is provided. A co-sided EAM is formed on the top surface of the non-conducting substrate. Formation of the co-sided EAM includes the steps of: forming an EAM first type base layer with a top surface on the top surface of the non-conducting substrate; forming an EAM waveguide layer on the EAM first type base layer, the EAM waveguide layer including an electroabsorption portion; forming an EAM second type semiconductor layer on the EAM waveguide; etching the EAM second type semiconductor layer and the EAM waveguide layer to form an EAM second type semiconductor region and an EAM waveguide and exposing at least one side portion of the top surface of the EAM first type base layer; forming an EAM insulating layer on the at least one side portion of the top surface of the EAM first type base layer; etching the EAM insulating layer to expose at least one contact region of the at least one side portion of the top surface of the EAM first type base layer. At least one capacitor is also formed on the top surface of the non-conducting substrate. Formation of each capacitor includes the steps of: forming a non-EAM-side capacitor electrode on the top surface of the non-conducting substrate; forming a capacitor dielectric layer on the non-EAM-side capacitor electrode; and forming an EAM-side capacitor electrode on the capacitor dielectric layer.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 7B is a top plan drawing of an exemplary biased co-sided contact type EAM device shown in FIG. 7A.

DETAILED DESCRIPTION

Figure 1A:
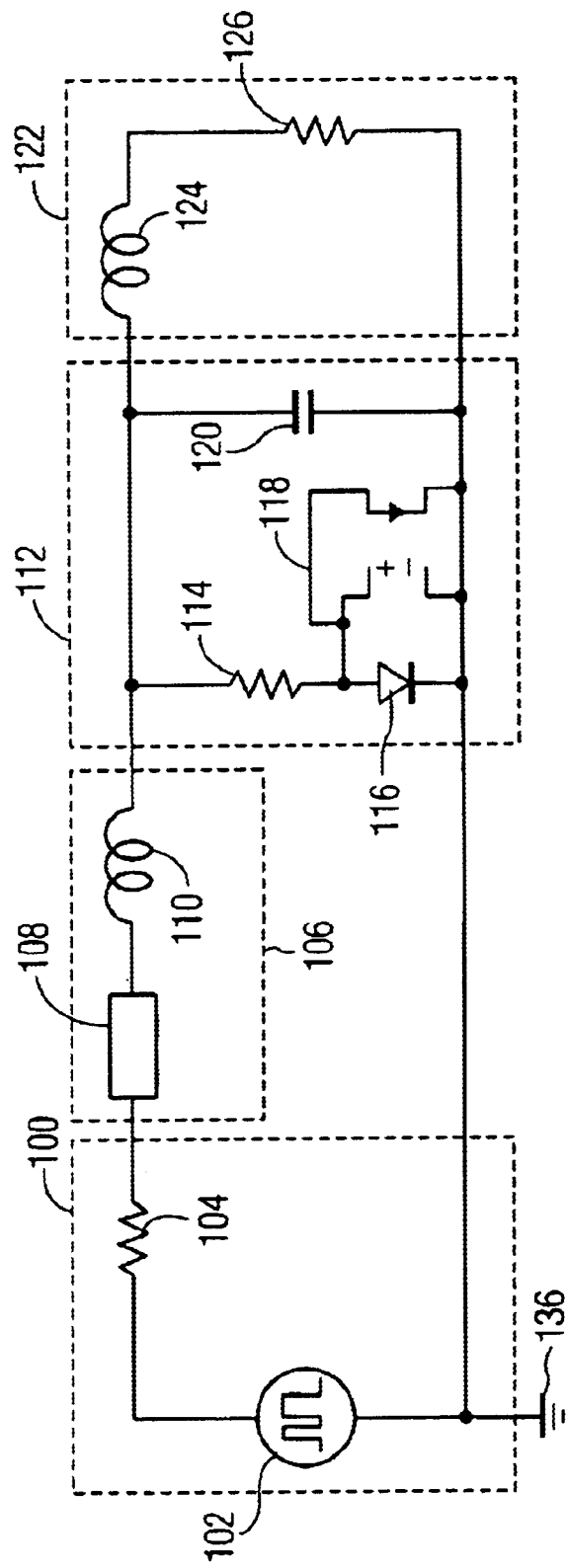
FIG. 1A is a schematic diagram of a prior art EAM drive circuit.
Figure 1B:
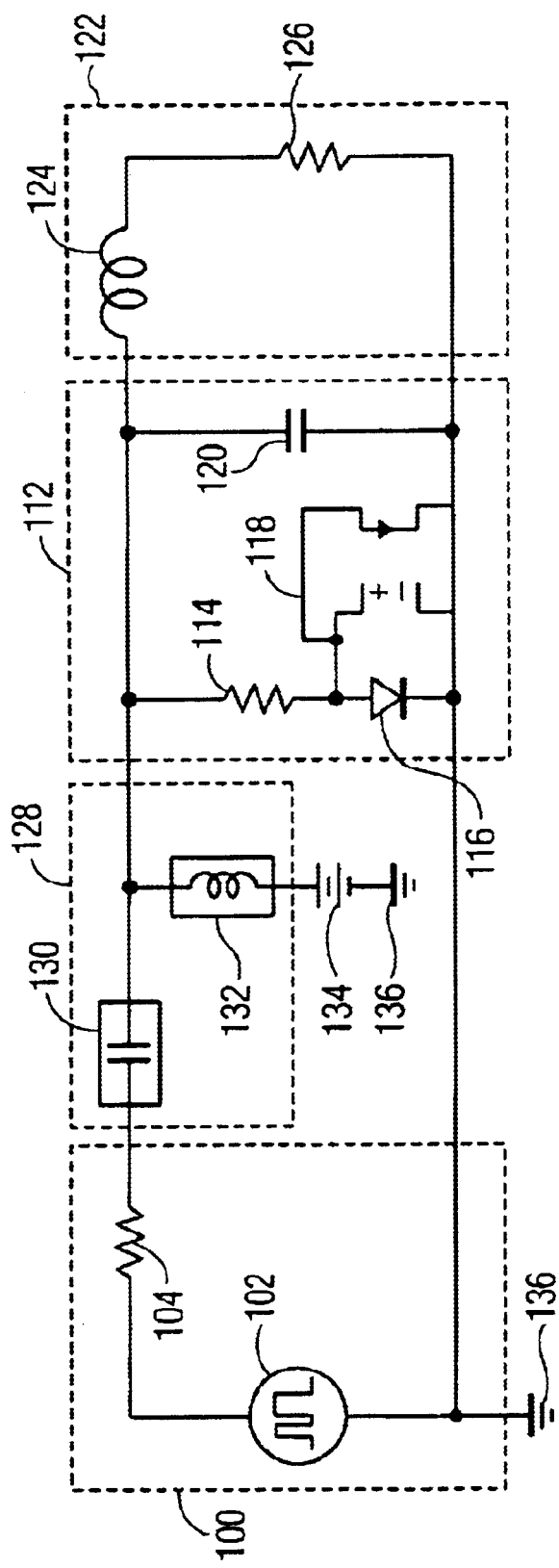
FIG. 1B is a schematic diagram of another prior art EAM drive circuit.

The present invention involves a method of providing a DC bias voltage to an EAM, having a P/N junction and n and p contacts, which neither uses a bulky bias tee circuit 128, as in FIG. 1B, or a DC bias voltage to be supplied by a variable (RF signal) voltage source 102 included in drive electronics 100, as in FIG. 1A. In one exemplary embodiment of the invention, the first plate of a capacitor is electrically coupled to the n contact of the EAM and the second plate of the capacitor is electrically coupled to an AC ground, such as a common potential. The DC bias voltage is provided to the first plate of the capacitor, and thereby to the n contact of the EAM. The p contact of the EAM is connected to a source of alternating voltage, which may be RF alternating voltage. In another exemplary embodiment of the invention, a capacitor has one plate in electrical contact with one side of the P/N junction and connected to a voltage source. The other plate of the capacitor is in electrical contact with an AC ground. The other side of the P/N junction is coupled to a source of alternating voltage, which may be an RF alternating voltage.

Figure 2A:
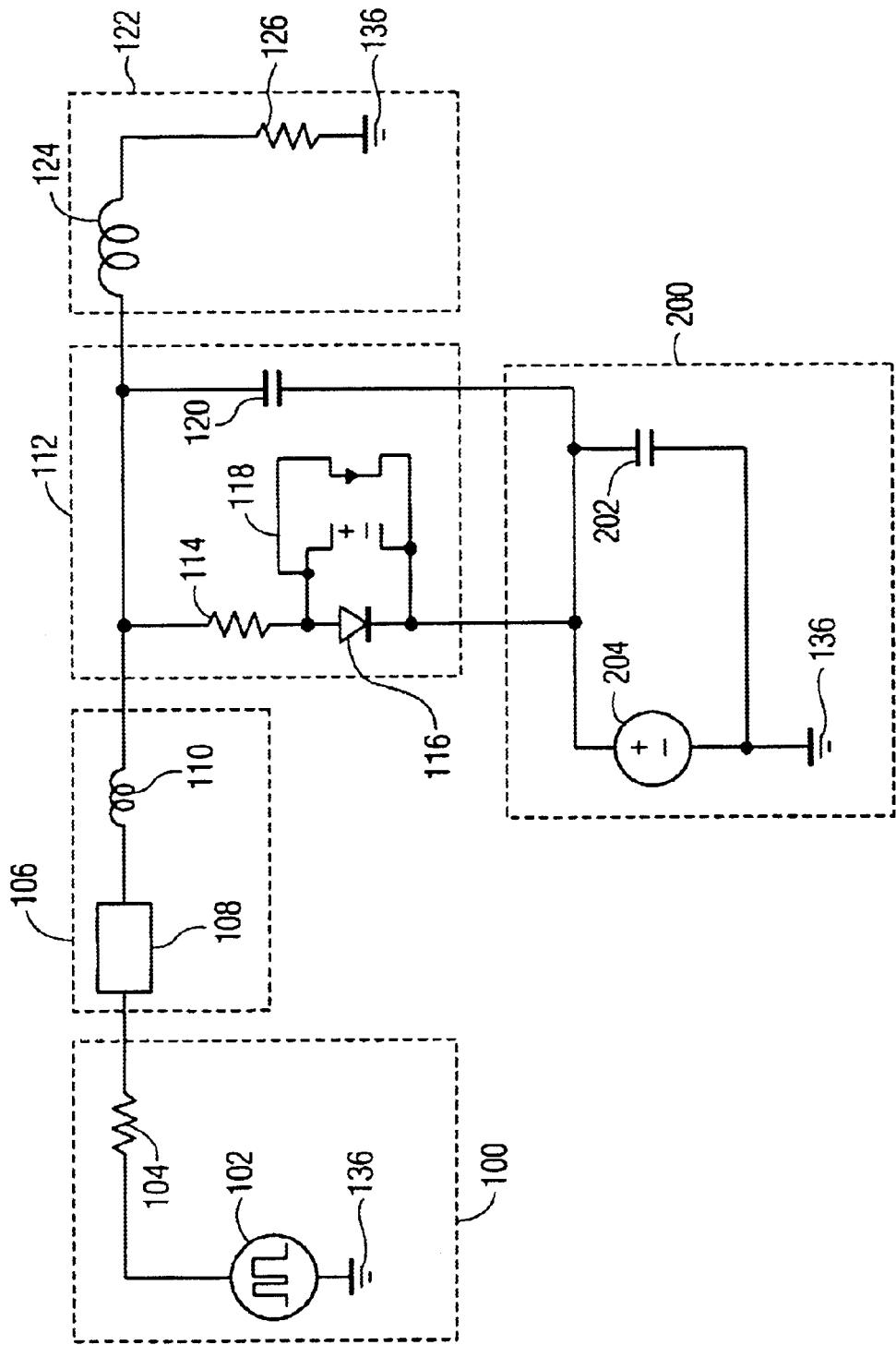
FIGS. 2A and 2B are schematic diagrams of exemplary EAM drive circuits according to the present invention.

FIG. 2A illustrates an exemplary circuit to provide a DC bias to an EAM 112 through the n-side of the EAM. Drive electronics 100 include square wave voltage source 102 coupled through resistor 104 to transmission line 108 in HIC 106. Inductor 110 represents the inductance of the connection between transmission line 108 and EAM 112. The p-side of EAM 112 is coupled through HIC 106 to the output terminal of drive electronics 100 and is represented as a series resistor 114 and diode 116, and a capacitor 120 in parallel with the resistor and the diode. In this exemplary circuit, the DC bias voltage is provided by capacitively bypassed DC voltage source 200, which is coupled to the n-side of EAM 112. DC voltage source 200 includes capacitor 202 and DC bias voltage supply 204. DC bias voltage supply 204 may be a constant voltage source or may provide an adjustable voltage. The desired DC bias voltage may be chosen to be either positive or negative depending on the characteristics of EAM 112.

Desirably, capacitor 202 is small enough to fit on the EAM chip within an optical modulator package. Parallel plate, thin film dielectric capacitors formed as part of the EAM chip may, desirably, be used. Multilayer capacitors, with interdigitated parallel plates, may alternatively be formed as part of an exemplary EAM chip. Commercially available discrete capacitors may also be employed. The capacitance and DC voltage rating of capacitor 202 may be chosen based on the desired operating frequency and the desired DC bias voltage of EAM 112. Capacitor 202 desirably has a capacitance of at least about 25 pF, and may, for example, have a capacitance of 65–100 pF. It will be understood that capacitor 202 may be replaced by any device or structure which, although not strictly denominated a capacitor, has capacitive properties (e.g. a reverse biased p/n junction, a varactor diode, etc.).

One side of DC bias voltage supply 204 and one plate of capacitor 202 are connected to ground 136. Capacitor 202 is used to bypass the DC bias connected to the n-side of the EAM, providing AC signals from the n-side of the EAM with a low impedance path to ground. The p-side of the EAM is directly connected to the drive electronics. Therefore, no bias tee is needed to couple the EAM to the drive electronics 100. As shown in FIGS. 1A and 1B, the p-side of the EAM is also connected to a termination resistor 126 and termination resistor 126 is connected to ground 136. Inductor 124 is shown to represent the inductance in the connection, which may be a ribbon bond, for example, from the EAM 112 to resistor 126.

It is noted that, although FIG. 2A illustrates drive electronics 100, termination 122, and capacitively bypassed DC voltage source 200 as electrically connected to ground, these circuit elements may be connected to a common wire instead. The common wire may, in turn, be connected to a source of reference potential different from ground. Although these circuit elements are described as being connected to ground regarding various embodiments of the present invention, it should be understood that a common wire may be used alternatively, in any of the embodiments.

Figure 2B:
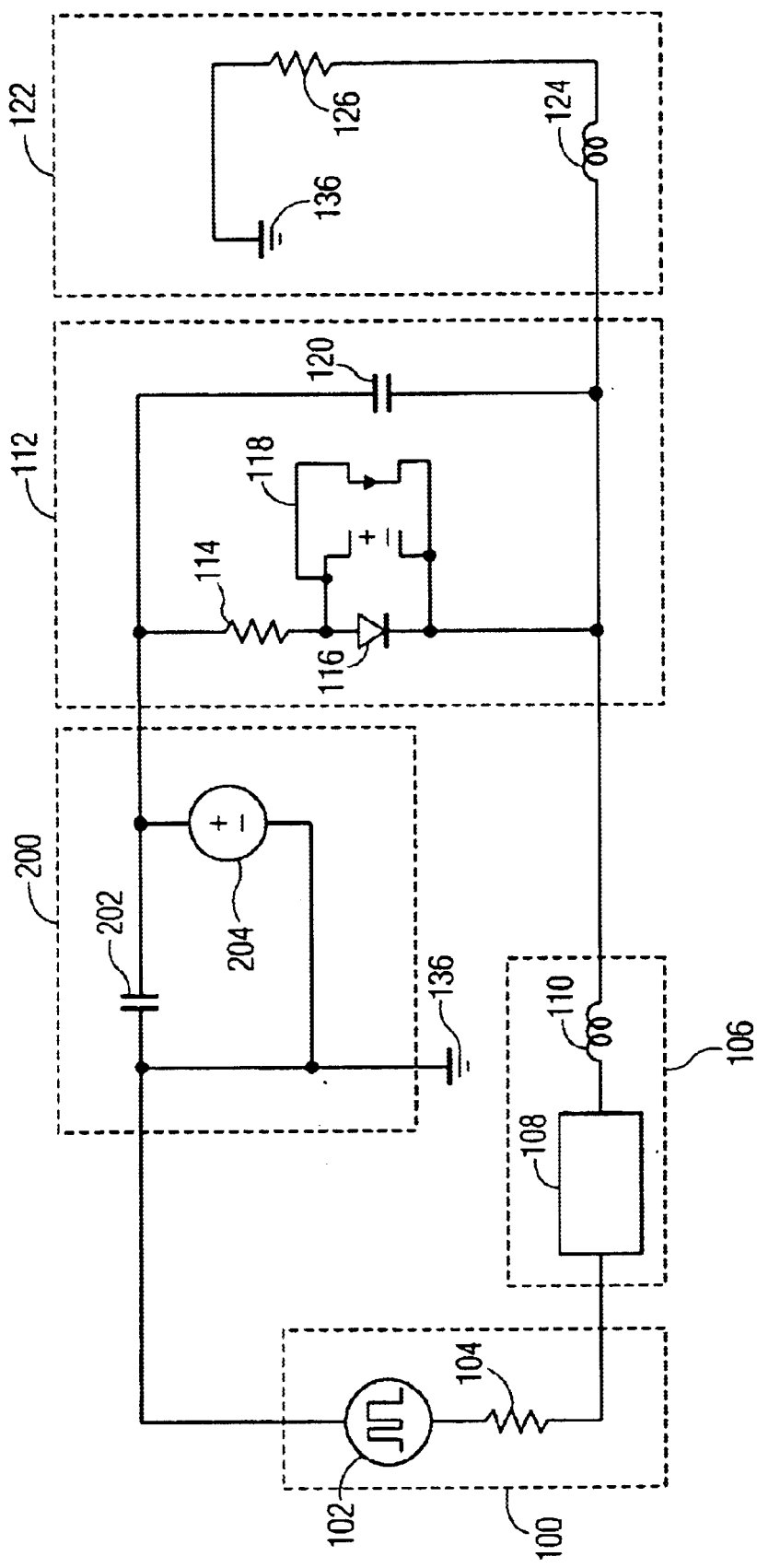

In the exemplary circuit of FIG. 2B, the DC voltage source 200 is coupled to the p-side of EAM 112 to provide bias voltage. Drive electronics 100 are coupled through HIC 106 to the n-side of EAM 112 to provide modulation. Termination 122 is also connected to the n-side of EAM 112 in this exemplary embodiment. It is contemplated that, although the exemplary embodiments described below with respect to FIGS. 4, 5, 6, 7A, 7B, 8, 9, 14, 15A, 15B, 16, 17, 25, and 26 are adapted for use with the exemplary circuit of FIG. 2A, one skilled in the art understand that any of these embodiments may be adapted for use with the exemplary circuit of FIG. 2B by changing the p-doped semiconductor layers of the EAM's in these embodiment to n-doped semiconductor layers and changing the n-doped semiconductor layers of the EAM's in these embodiment to p-doped semiconductor layers.

Figure 3:
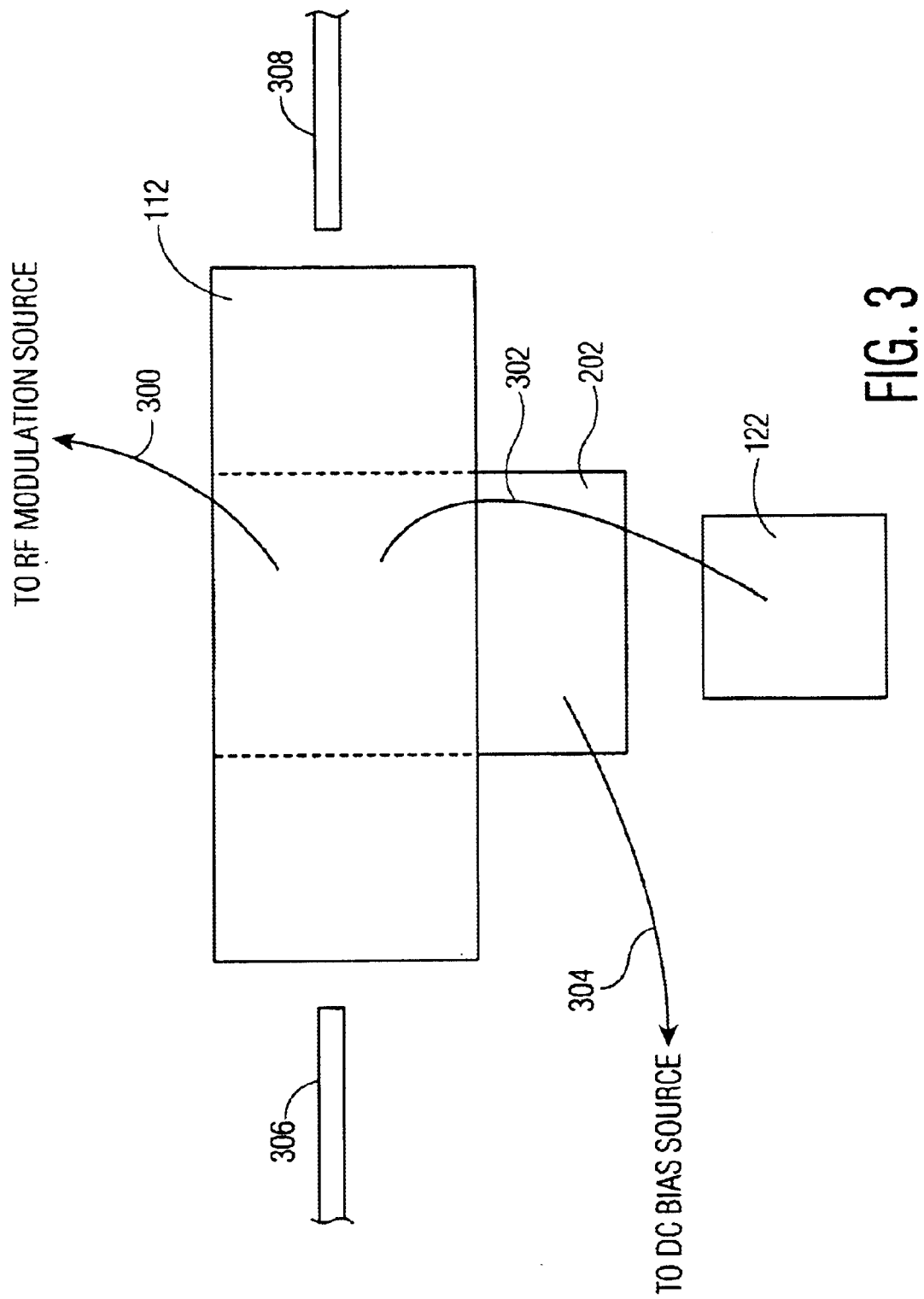
FIG. 3 is a top plan drawing of an exemplary biased EAM device.

FIG. 3 is a top plan drawing of an exemplary biased EAM device that may be included in the exemplary circuit of FIG. 2. EAM 112 is shown with optical fibers 306, 308 positioned to provide optical input signals to the EAM and to receive optical output signals from the EAM, respectively. Capacitor 202 is shown partly in phantom under EAM 112 and extending beyond EAM 112 on one side to provide for connection to the DC bias voltage supply 204 (not shown). The ends of EAM 112 extend beyond and overhang capacitor 202 to reduce any interference of capacitor 202 with the optical coupling between EAM 112 and adjacent optical fibers 306 and 308. Conductor 304 is shown bonded to the first plate of capacitor 202 and extending to the DC bias voltage supply (not shown). Termination 122 is shown bonded by conductor 302 to EAM 112. Conductors 302 and 304 may soldered or ribbon-bounded or may be implemented as printed traces on a substrate.

Figure 4:
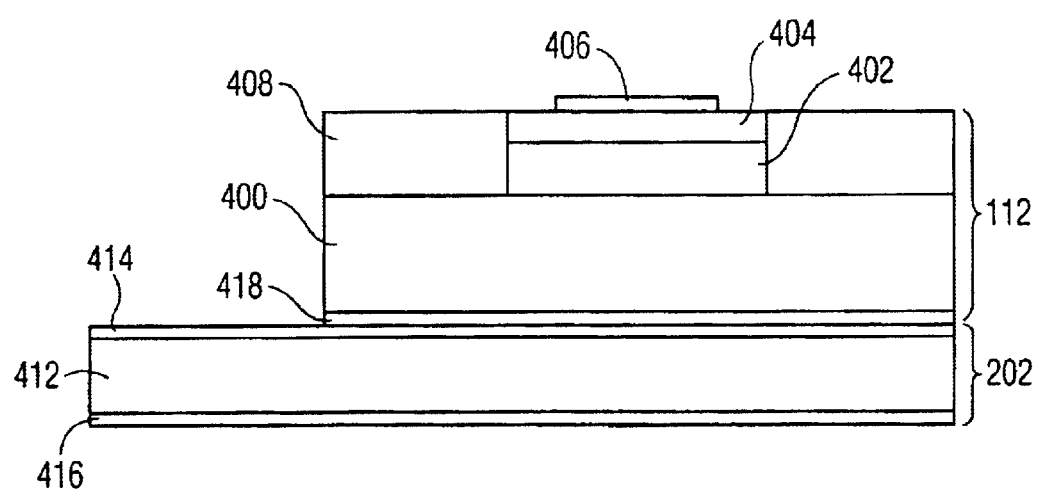
FIG. 4 is a side plan drawing of an exemplary monolithic EAM chip shown in FIG. 3 with bias capacitor.

FIG. 4, is a side plan drawing of the biased EAM device of FIG. 3. EAM 112 is located over capacitor 202. Capacitor 202 includes dielectric layer 412, first plate 414 and second plate 416. As described above, with reference to FIG. 3, first plate 414 is electrically coupled by conductor 304 to DC bias voltage supply 204 (not shown). Second plate 416 is electrically coupled to ground potential. Desirably second plate 416 may be coupled to ground by conductive solder, such as indium, silver, or lead based solders, gold/tin solder, gold/germanium solder, conductive epoxy, or cold welding, or it may be electrically coupled using other semiconductor assembly techniques, such as ribbon bonding. Commercially available discrete ceramic, mica, or plastic parallel plate capacitors may be employed in the exemplary embodiment of FIG. 4. It will be understood that capacitor 202 may be replaced by any device or structure which, although not strictly denominated a capacitor, has capacitive properties.

EAM 112 may be desirably formed on an n+ doped substrate 400. Active region 402 may be formed on n+ layer 400. Active region 402 is desirably a waveguide to pass an optical signal through EAM 112, in addition to being an electroabsorption medium to modulate the optical signal in response to the variable voltage signal provided by the drive circuitry as shown in FIG. 2. This electroabsorption medium may be a bulk optically active material or a quantum well structure. EAM 112 may desirably include insulating layer 408 formed on either side of active region 402. Insulating layer 408 may provide surface passivation for active region 402 and/or improve confinement of the optical signal within active region 402. The p+ region 404 is desirably formed over active region 402. A p contact 406 with the p-side of the EAM is desirably provided over a p+ region 404. First plate 414 of capacitor 202 is both mechanically and electrically coupled by n contact layer 418 to n+ substrate 400 of EAM 112. N contact layer 418 may be conductive solder, such as, gold/tin or gold/germanium, conductive epoxy, or a cold-welded metal layer, such as indium.

Figure 5:
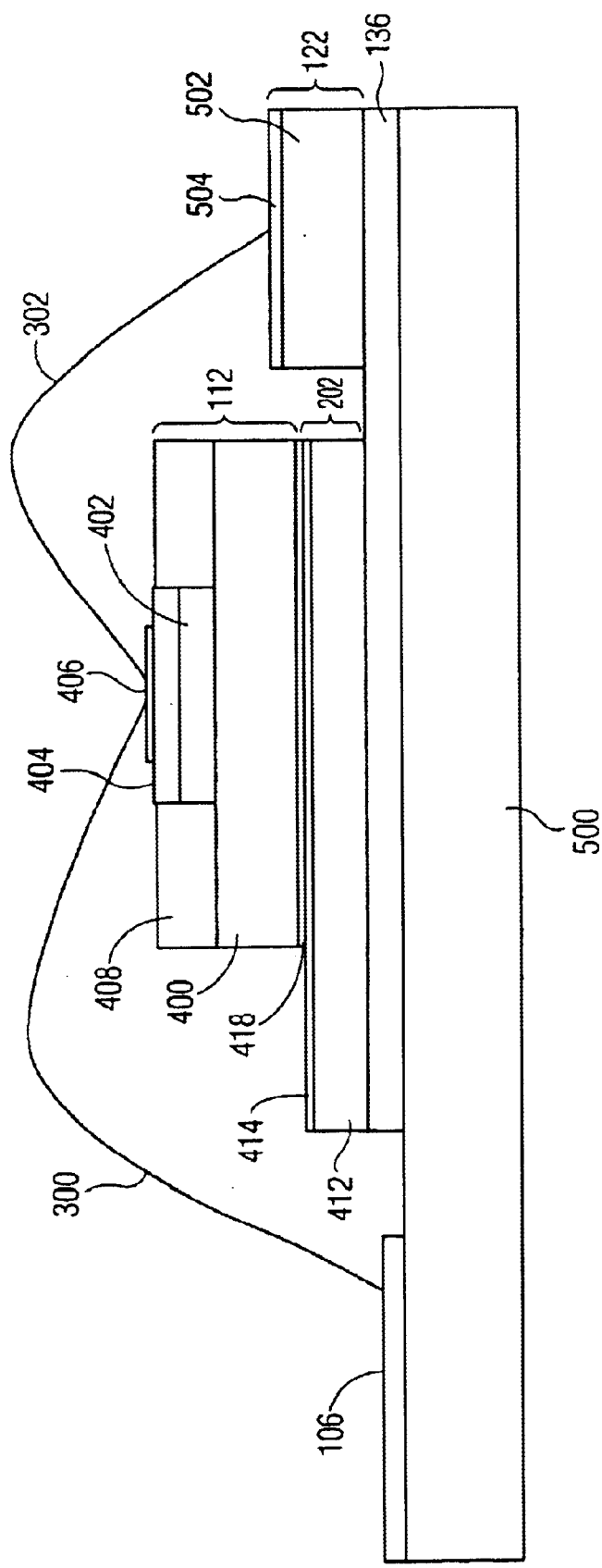
FIG. 5 is a side plan drawing of an exemplary biased EAM device shown in FIG. 3.

FIG. 5 is a side plan drawing of another exemplary biased EAM device according to the present invention. This device includes a transmission line 106, termination circuit 122, capacitor 202, and EAM 112 all assembled on a single hybrid integrated circuit (HIC) substrate 500. A bias voltage may be applied to the first plate 414 of capacitor 202 through a conductor (not shown). The second plate of capacitor 202 may be a ground plane 136. The drive electronics (not shown) are connected to transmission line 106. Conductor 300 connects p contact 406 of EAM 112 to transmission line 106. Conductor 302 connects p contact 406 of EAM 112 to contact 504 of termination 122. Termination 122 connects to ground across a resistor layer 502.

HIC substrate 500 is desirably formed from an insulating or semi-insulating material, such as silicon, alumina, germanium, indium phosphate, gallium arsenide, etc. Transmission line 106 is desirably formed of a conductive material, such as aluminum, gold, silver, copper, nickel, titanium, tungsten, platinum, germanium, polyaniline, polysilicon or a combination of these materials, using standard fabrication techniques on HIC substrate 500. Transmission line 106 is desirably designed to transmit the variable voltage (RF) signal from the drive electronics (not shown) to EAM 112 with minimal power loss and signal distortion. Ground plane 136 may also desirably be formed on the HIC substrate 500.

In this exemplary embodiment, capacitor 202 and termination 122 are formed as a monolithic component with ground plane 136 and HIC substrate 500. Dielectric layer 412 of capacitor 202 and resistor layer 502 of termination 122 are formed on HIC substrate 500 and electrically coupled to the ground plane 136. These layers may be formed, for example, using standard thick film processing techniques. Instead of using the bulk resistance of resistor layer 502, the resistor 502 may be formed, using a resistive ink having the desired resistance characteristics, as a thick film resistor horizontally along the surface of the HIC substrate with contacts on opposite ends of the resistor, rather than vertically with contacts on the top and bottom, as shown.

A letter-number-letter code, which defines the temperature coefficients of a dielectric, has been developed and is defined in the Electronic Industries Association (EIA) Standard 198. Dielectric layer 412 may desirably be formed of a variety of dielectric materials, including EIA Standard 198 code X7R, Z5U, and Y5V dielectrics and dielectric materials which meet the NPO (negative-positive-zero) MIL specification. These dielectric materials may include oxides of neodymium, samarium, and other rare earth elements. Dielectric layer 412 may also be formed using a thick film dielectric paste, such as $BaTiO_3$, $SrTiO_3$, $TiO_2$, $BaNdTiO_3Bi$, $NdBaTiO_3$, $PbMgNdO$, $BaTiO_3Bi$, $ZrSnTiO_3$, $Nb_2O_5$, $CoO$, $BaZrO_3$, $PbZrO_3$, $BaSnO_3$, $PbSnO_3$, borosilicate glass frit, or combinations thereof. First plate 414 of capacitor 202 and contact 504 of termination 122 may be formed of a conductive material on dielectric layer 412 and resistor layer 502, respectively.

EAM 112 desirably includes the n-doped substrate 400. EAM 112 may be positioned over capacitor 202 with the n-doped substrate 400 in electrical contact with first plate 414 of parallel plate capacitor 202. EAM 112 may be coupled to first plate 414 of capacitor 202 by n contact layer 418, as in the exemplary embodiment described above with reference to FIG. 4.

Figure 6:
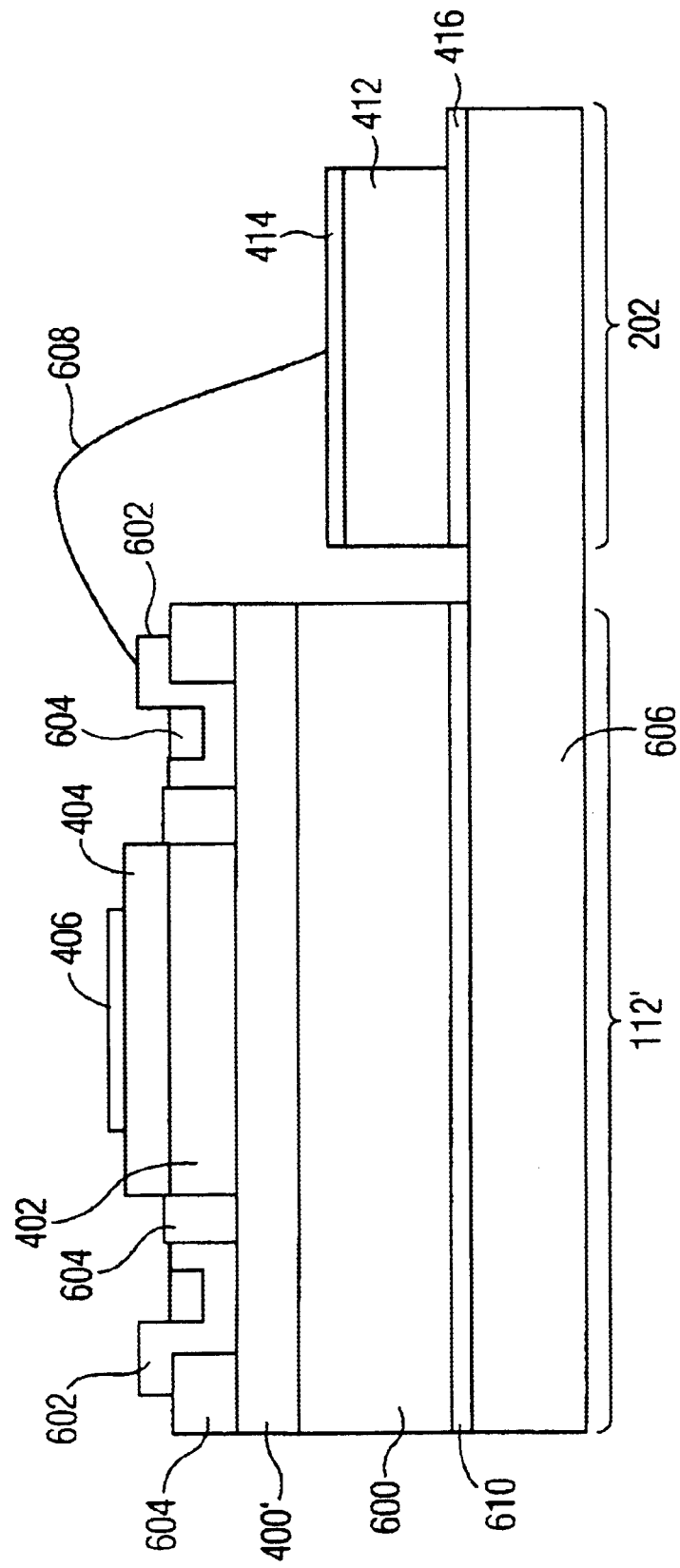
FIG. 6 is a side plan drawing of an exemplary mounted co-sided contact type EAM chip with bias capacitor.

FIG. 6 illustrates a co-sided contact type EAM 112' having a capacitor 202 formed on an HIC substrate 606. The co-sided contact type EAM 112' and the parallel plate capacitor 202 are adjacent to one another on HIC substrate 606. HIC substrate 606 may be desirably formed of an insulating or semi-insulating material similar to the HIC substrate in FIG. 5, or may, alternatively, be formed of conducting or semiconducting material, such as steel, aluminum, or doped silicon, germanium, or a III/V material. The EAM is mounted on substrate 606.

The capacitor 202 has second plate 416 formed of a conductive material on HIC substrate 606. Dielectric layer 412 may be formed on second plate 416 using thick film techniques. First plate 414 is desirably formed on dielectric layer 412. Dielectric layer 412 is desirably selected to be of a material and to have dimensions to provide capacitance of at least about 25 pF with a breakdown voltage greater than about 1V. In this embodiment, second plate 416 desirably extends beyond the dielectric layer 412 to provide a contact region. A connection to ground is desirably provided to second plate 416. It is noted that if HIC substrate 606 is formed of a conducting material second plate 416 may not necessarily extend beyond dielectric layer 412 or may even be omitted as in the embodiment of FIG. 5. Conductor 608 provides an electrical connection between first plate 414 and n-contact 602, so that first plate 414 and n-region 400 are in electrical contact.

The exemplary co-sided contact type EAM of FIG. 6 is formed on semi-insulating substrate 600. Semi-insulating substrate 600 may, desirably, be an intrinsic semi-insulating material, preferably a III/V material, such as such as GaAs, InP, InGaAsP, AlGaAs, or InSb. Semiconducting n+ doped region 400' is formed on semi-insulating substrate 600 and serves as the n region for the co-sided contact type EAM 112'. Active region 402 is disposed on n+ layer 400', surrounded by insulating regions 604. Semiconducting p+ doped region 404 is disposed over active region 402 and a portion of insulating regions 604. Semiconducting n+ layer 400', active region 402, and semiconducting p+ doped region 404 are desirably formed of semiconducting material of the same family as semi-insulating substrate 600. Insulating regions 604 may be formed of intrinsic semi-insulating material, preferably of the same type as semiconducting n+ layer 400', or may be formed of an insulating material such as polyimide, for example. Conductive contacts 602 for n+ layer 400' are provided through gaps in the insulating regions 604 and p contact 406 is provided on p+ region 404. It is contemplated that, although the exemplary co-sided contact EAM's shown in FIGS. 6, 7A, 7B, and 16 include two n contacts 602, other numbers of n contacts, either greater or less than two, may be desirable.

The co-sided contact type EAM is desirably connected to HIC substrate 606 by mechanical contact layer 610. Mechanical contact layer 610 may, desirably, be epoxy or thermoplastic adhesives, or may be a solder.

Figure 7A:
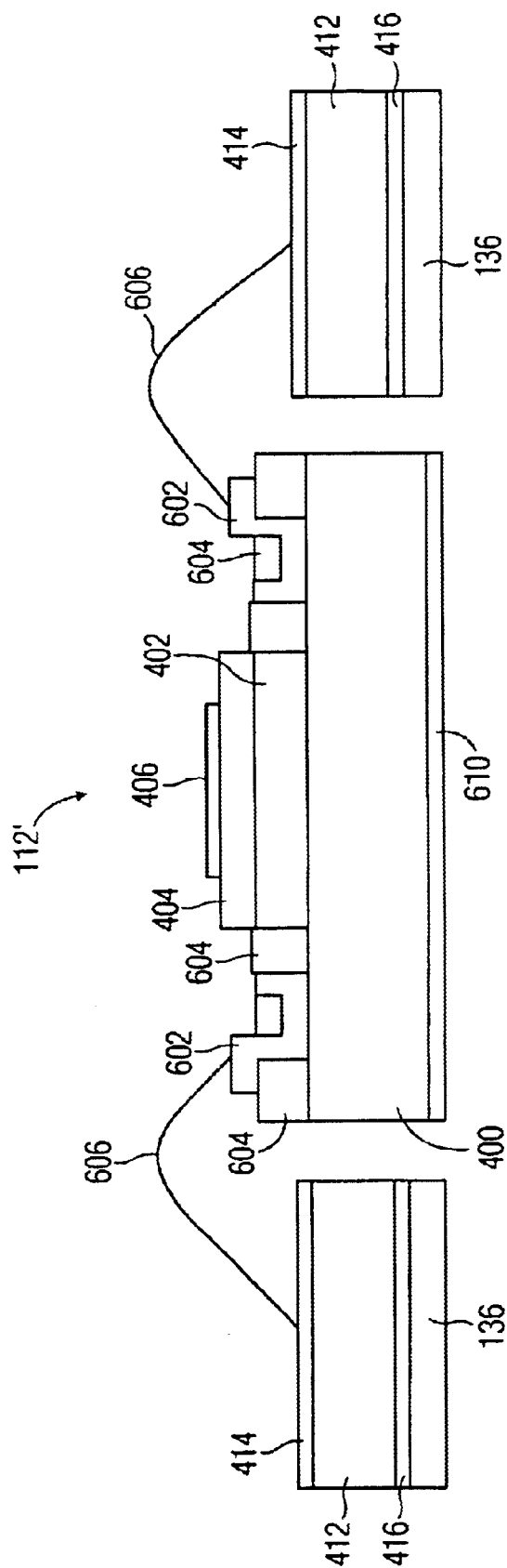
FIG. 7A is a side plan drawing of an exemplary biased co-sided contact type EAM device.

FIGS. 7A and 7B illustrate another exemplary embodiment of the invention for use in a co-sided contact EAM. The exemplary co-sided contact EAM is fabricated on n+ doped substrate 400, with both n contacts 602 and p contact 406 on the same side of the device. In FIG. 7B, there is shown a top plan drawing of an exemplary biased EAM device including a co-sided contact EAM 112'. EAM 112' is shown with p contact region 406 in the center of its upper surface and two n contact regions 602 also on the upper surface but on either side of p contact region 406 and symmetrically located with respect to the p contact region. Two parallel plate capacitors 202 are also shown. Capacitors 202 are placed adjacent to EAM 112', spaced away therefrom. Capacitors 202 may, desirably, be placed on a ground plane 136, as shown in FIG. 7A. Conductors 606 join n contact regions 602 to the first plates of capacitors 202. The first plates of capacitors 202 are each also bonded to a DC voltage supply (not shown). Preferably both capacitors are bonded to the same DC voltage supply. High-speed signal transmission line 106 provides the high speed alternating voltage signal to the EAM 112'. Conductor 300 is bonded from high-speed signal line 106 to the EAM p contact 406.

Termination resistor 122 is shown electrically connected by ribbon bond 302 to p contact 406.

FIG. 7A is a detailed side plan drawing of EAM 112' and capacitors 202 from FIG. 7B. The exemplary EAM is formed on n+ doped substrate 400, with mechanical contact layer 610 thereunder. Active region 402 is disposed on n+ substrate 400, surrounded by insulating regions 604. Conductive n contacts 602 for n+ layer 400 are provided through gaps in insulating regions 604. A p+ doped semiconductor region 404 is disposed over active region 402 and a portion of surrounding insulating regions 604. P contact 406 is provided on p+ region 404.

The exemplary capacitors include second plates 416 (which are in contact with ground plane 136), dielectric layers 412, and first plates 414. It will be seen that each of the pair of capacitors is a parallel-plate dielectric capacitor. These capacitors may be discrete capacitors, with second plates 416 electrically, and mechanically, coupled to ground plane 136, or they may be formed directly on ground planes 136 by a thick film technique. If the capacitors are formed directly on the ground plane, second plates 416 may be omitted.

Figure 8:
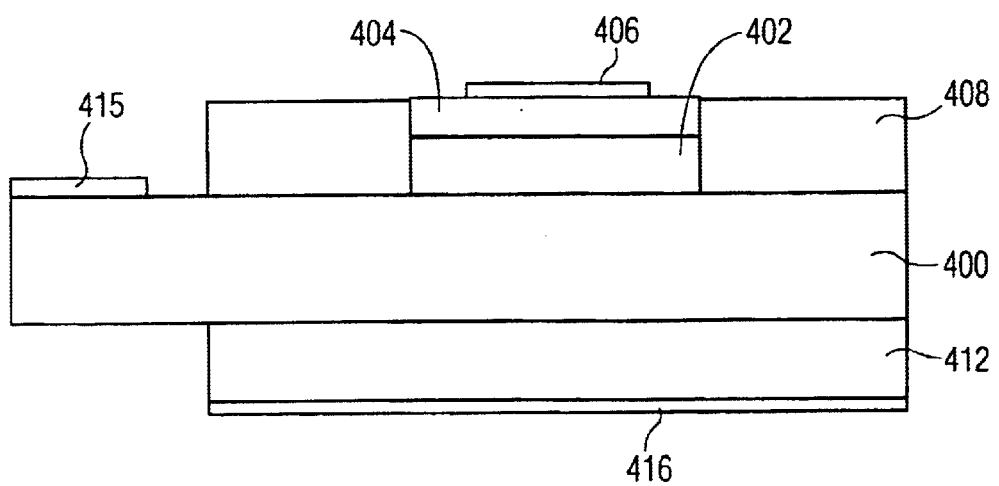
FIG. 8 is a side plan drawing of an exemplary monolithic EAM chip with bias capacitor.

FIG. 8 is side plan drawing of an exemplary monolithic EAM chip with opposite-facing contacts and a bias capacitor integrated onto n+ doped substrate 400. Semiconducting n+ doped substrate 400 serves as part of the first plate of the capacitor, as well as the n region of the EAM. Semiconducting n+ doped substrate 400 is shown extended to the right, beyond the dielectric 412, to provide a contact region, and EAM-side capacitor contact region, 415 for application of a conductor to the DC bias voltage supply (not shown). Although contact region 415 is shown on the upper side of substrate 400, it is contemplated that it may alternatively be formed on the lower side of the substrate. Active region 402 is formed on n+ layer 400, and may have insulating material 408 on each side thereof. Semiconducting p+ doped region 404 is formed over active region 402, and may also have insulating material 408 on each side thereof. A contact 406 for semiconducting p+ doped region 404 is formed on semiconducting p+ doped region 404. Dielectric layer 412 is formed on substrate 400. Any suitable high-strength dielectric may be used for dielectric material 412. The thickness and material for dielectric layer 412 are preferably selected to provide a capacitance of at least about 25 pF with a breakdown voltage of at least about 1V. A conductive layer 416 is formed on dielectric layer 412. Conductive layer 416 serves as the second plate for the parallel plate capacitor. Layer 416 is electrically coupled to a ground potential (not shown).

Figure 9:
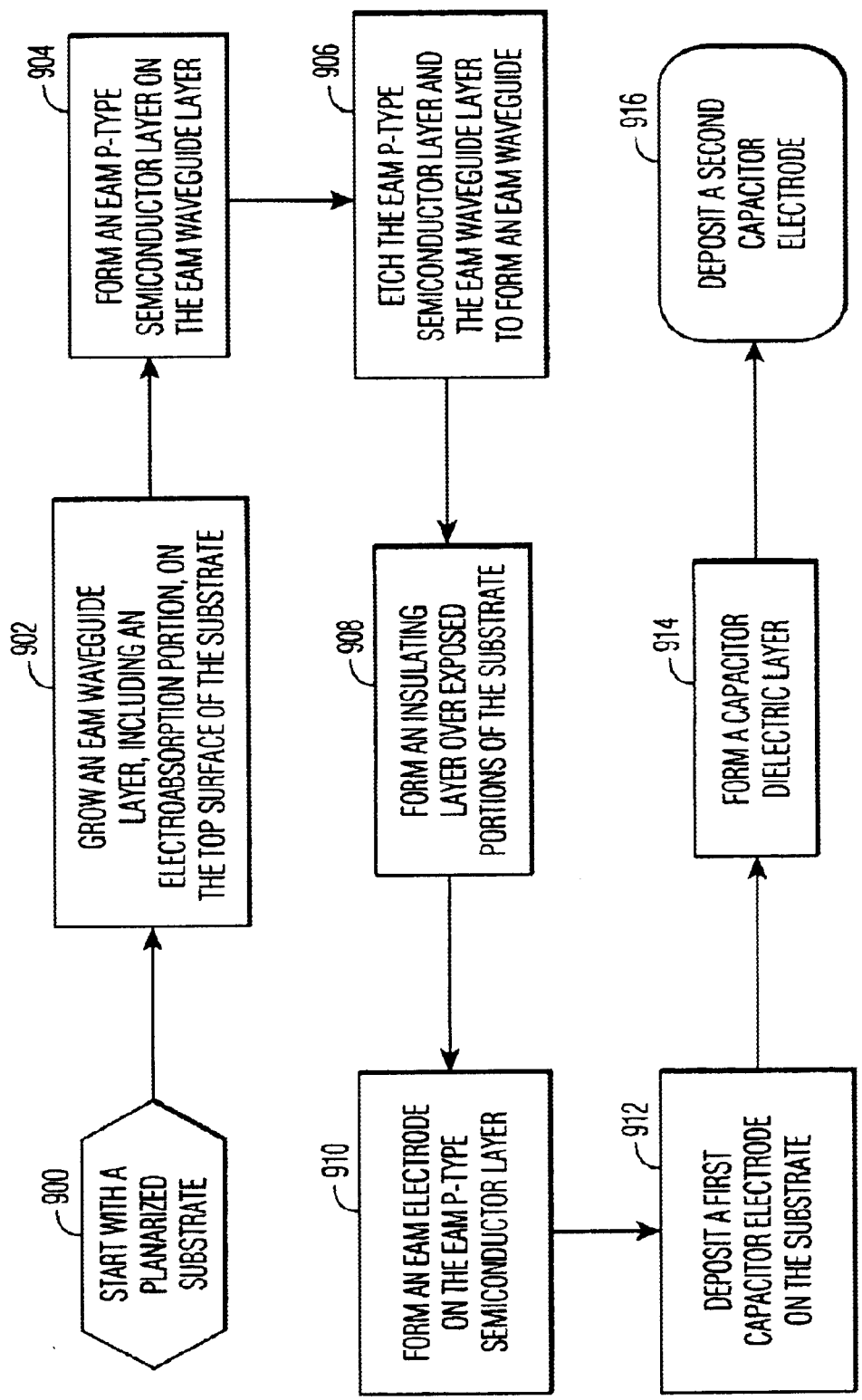
FIG. 9 is a flowchart illustrating an exemplary method of manufacture of the exemplary monolithic EAM chip with bias capacitor of FIG. 8.

FIG. 9 is a flowchart illustrating fabrication steps for an exemplary monolithic EAM chip of the present invention. FIGS. 10–13 illustrate various steps in this exemplary fabrication process.

Figure 10:
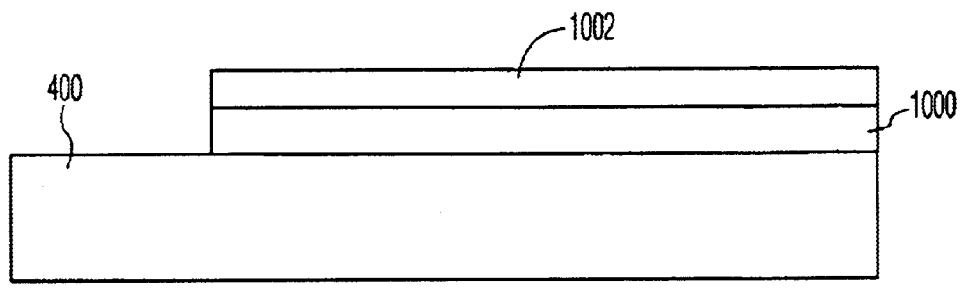
FIGS. 10, 11, 12, and 13 are side plan drawings of an exemplary monolithic EAM chip with bias capacitor during manufacture according to the flowchart of FIG. 9.

First, a substrate, element 400 in FIG. 10, is provided, step 900. The substrate may be a single layer n+ doped semiconductor material, preferably a III/V composition such as GaAs, InP, InGaAsP, AlGaAs, or InSb. The substrate may serve several functions in the exemplary monolithic EAM chip, including mechanical support, electrical contact, and a cladding layer to help confine the optical mode in the active layer.

As shown in FIG. 10, an active layer or EAM waveguide layer 1000, including an electroabsorption portion, is formed on top of the substrate, step 902. The active layer that is formed may be either a quantum well structure or a bulk material and is desirably formed of III/V materials selected to form a heterojunction with the substrate layer. Specific composition of the group III and group V compounds may be selected to provide desired optical absorption and confinement for an optical signal of a selected wavelength. This layer is desirably approximately 0.2–0.3 $\mu$m thick. The active layer may, for example, be grown by an epitaxial technique such as liquid phase epitaxy (LPE), metal organic chemical vapor deposition (MOCVD), molecular beam epitaxy (MBE), or chemical beam epitaxy (CBE).

Alternatively, a quantum well structure may be formed within active layer 1000. The thickness of the quantum well sub-layers is based on the energies of the holes and/or electrons to be confined within the layers and also upon the particular material composition selected, but are desirably of a proper dimension so that quantum confinement in the vertical direction is present. In GaAs, for example, the thickness of the quantum well sub-layers may be between about 4 nm and about 40 nm.

A semiconducting p+ doped layer, element 1002 in FIG. 10, is then formed, step 904. FIG. 10 illustrates the exemplary monolithic EAM chip at this step in fabrication. The semiconducting p+ doped layer may be formed of a III/V material similar to the material of substrate layer and forms a second heterojunction with the EAM waveguide. The material composition of this layer also desirably provides a lower index of refraction than the index of refraction of the EAM waveguide, thereby ensuring significant optical confinement within the EAM waveguide for an optical signal at the selected wavelength. Semiconducting p+ doped layer 1002 may also have a wider band gap than the EAM waveguide to improve confinement of injected carriers within the EAM waveguide. The semiconducting p+ doped layer may alternatively be formed of multiple sub-layers desirably selected to shape the confined optical mode. These sub-layers may include different semiconductor materials such as silicon, alumina, III/V materials, and germanium. The semiconducting p+ doped layer preferably may be grown by an epitaxial technique such as LPE, MOCVD, MBE, or CBE, similar to the techniques used to form the EAM waveguide layer. Using the same growth method for both of these layers may be desirable to simplify manufacture, but it is not necessary.

Figure 11:
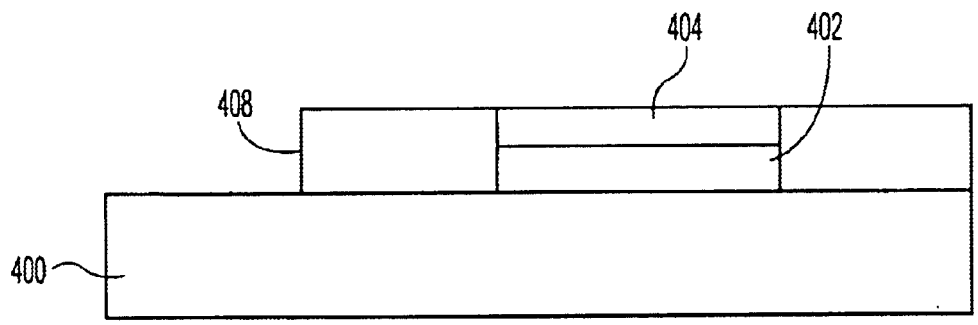

Semiconducting p+ doped layer 1002 and active layer 1000 are then etched, step 906, to form the EAM waveguide 402 (i.e. the active region of the monolithic EAM chip) and semiconducting p+ doped region 404, shown in FIG. 11. Although any standard semiconductor etching technique may be employed, a dry anisotropic etching technique may be desirable. The exact geometry of the EAM waveguide depends on the specific optical mode and carrier distribution desired.

The insulating layer, element 408 in FIG. 11, may be formed over exposed portions of the substrate and the side walls of the EAM waveguide 402 and p-type region 404, step 908. The insulating layer may be formed of insulating or semi-insulating material, such as SiO2, SiN, polyimide, alumina, or another insulating material using sputtering, evaporation, or other standard deposition techniques. It may be desirable for the insulating layer to be formed of an intrinsic III/V material by the same epitaxial method as was used to form the waveguide layer in step 902. The material composition of this layer also desirably provides a lower index of refraction than the index of refraction of the EAM waveguide, thereby ensuring significant optical confinement within the EAM waveguide for an optical signal at the selected wavelength. FIG. 11 illustrates the exemplary monolithic EAM chip at this stage of fabrication.

Figure 12:
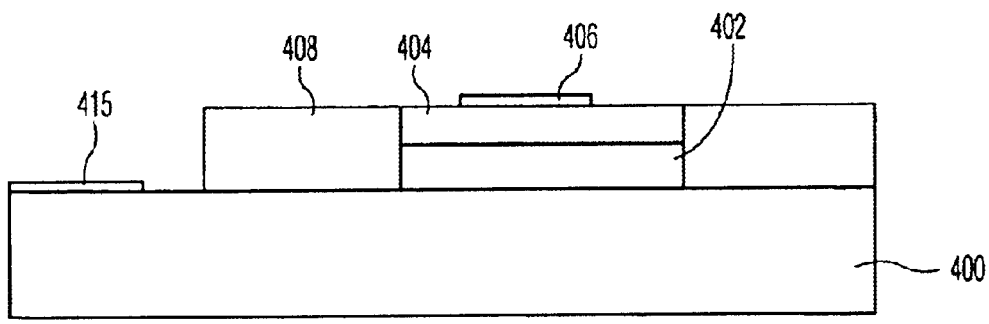

As shown in FIG. 12, EAM p contact 406 may be formed on semiconducting p+ doped layer using a standard deposition technique such as sputtering or evaporation, step 910. EAM p contact 406 is preferably formed from a conductive material. Patterning may be achieved by masking, etching, or the selection of a conductive material that does not adhere to the passivation material.

An EAM-side capacitor contact region, element 415 in FIG. 12, is deposited on the top surface of substrate 400, step 912 using a standard deposition technique such as sputtering or evaporation. EAM-side capacitor contact region 415 is preferably formed from a conductive material. Alternatively, the EAM-side capacitor contact region may be deposited on the bottom surface of the substrate to form the alternative exemplary monolithic EAM chips shown in FIGS. 14 and 15B.

Figure 13:
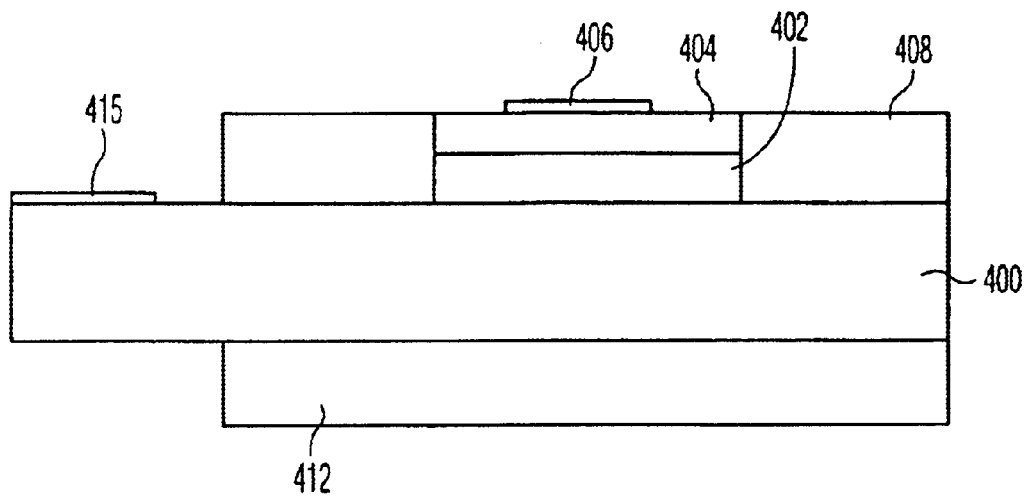

The capacitor dielectric layer, element 412 in FIG. 13, is formed, step 914, preferably using a thin film deposition technique, such as sputtering or e-beam evaporation. A thin film, including a dielectric, such as $SiO_x$, $SiN_x$, $BaTiO_3$, $SrTiO_3$, $TiO_2$, $Nb_2O_5$, CoO, $BaZrO_3$, $PbZrO_3$, $BaSnO_3$, $PbSnO_3$, borosilicate glass frit, polyimide, EIA Standard 198 code X7R, Z5U, or Y5V dielectrics, or combinations thereof, is formed on the bottom surface of substrate 400. Alternatively, the thin film may be deposited on the EAM-side capacitor electrode 414 to form the alternative exemplary monolithic EAM chips shown in FIGS. 14 and 15A or the thin film may be deposited on the top surface of the substrate to form the alternative exemplary monolithic EAM chip shown in FIG. 15B. Capacitors made this way generally range in value from 1 to 108 pF, depending on the area used and the type of dielectric material.

The non-EAM-side capacitor electrode 416 is formed on the dielectric layer, step 916. Both capacitor electrodes 414 and 416 are formed from a conductive material preferably the same conductive material as EAM p contact 406.

FIG. 8 illustrates a completed monolithic EAM chip formed by the exemplary process of the flowchart of FIG. 9. The alternative exemplary monolithic EAM chips of FIGS. 14, 15A and 15B may be formed by the exemplary process of the flowchart of FIG. 9, with the slight alterations described above with reference to steps 912 and 914.

Figure 14:
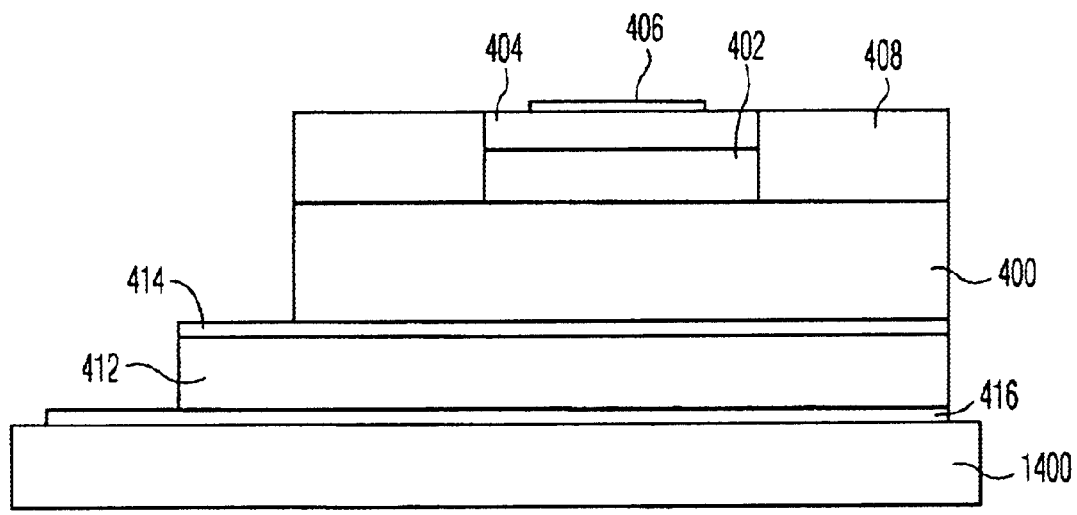
FIGS. 14, 15A and 15B are side plan drawings of alternative exemplary monolithic EAM chips with bias capacitor.
Figure 15A:
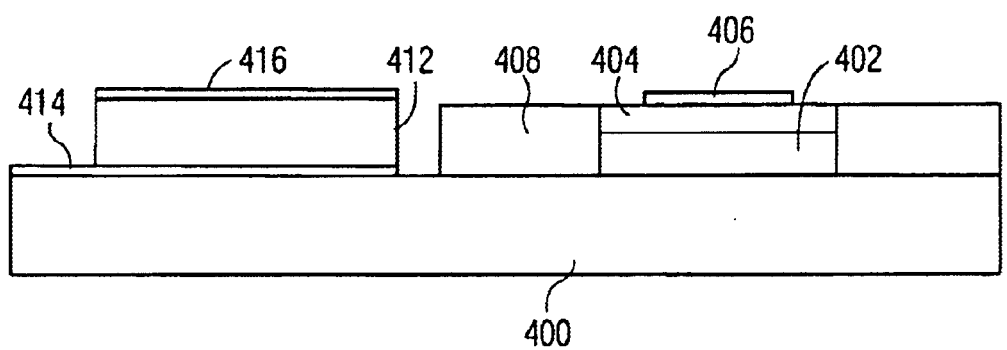
Figure 15B:
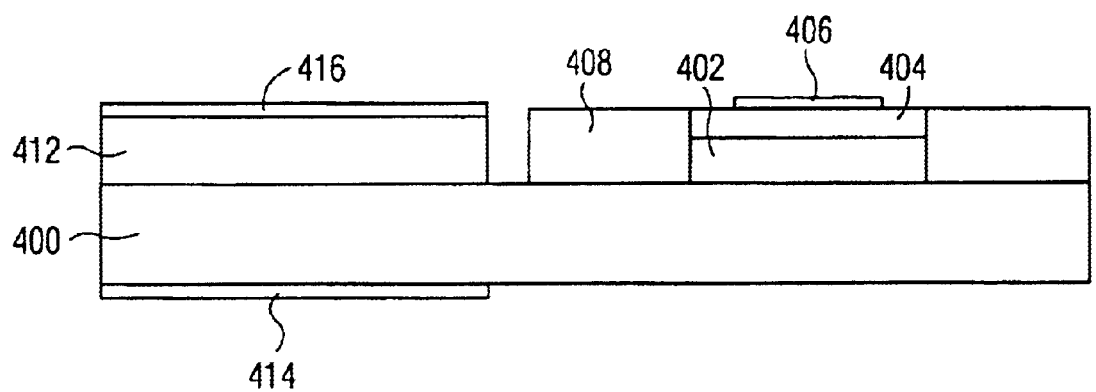

FIG. 14 illustrates an alternative exemplary monolithic EAM chip with EAM-side capacitor electrode 414 deposited on the bottom surface of substrate 400 and dielectric layer 412 formed on EAM-side capacitor electrode 414. The monolithic EAM chip of FIG. 14 is shown coupled to HIC substrate 1400. The alternative exemplary EAM chips shown in FIGS. 15A and 15B are formed with capacitor dielectric layer 412 on the same side of substrate 400 as the EAM. In FIG. 15A, EAM-side capacitor electrode 414 is disposed between the top surface of substrate 400 and dielectric layer 412, while in FIG. 15B, EAM-side capacitor electrode 414 is disposed on the bottom surface of substrate 400. It is noted that in the alternative embodiments of FIGS. 14 and 15A it is not necessary for EAM-side capacitor electrode 414 to completely (or even partially) separate substrate 400 from dielectric layer 412. It is contemplated that EAM-side capacitor electrode 414 may be reduced in size until only a contact region remains, as long as the contact region remains in contact with substrate 400.

Figure 16:
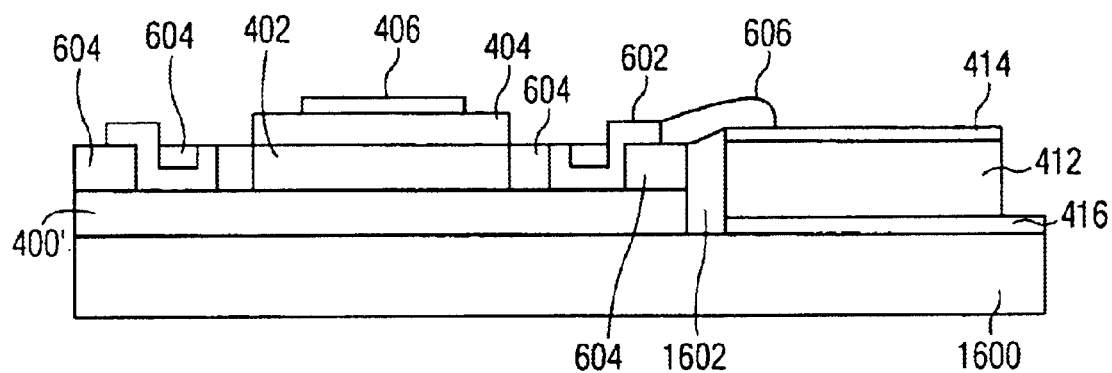
FIG. 16 is a side plan drawing of an exemplary monolithic co-sided contact type EAM chip with bias capacitor.

FIG. 16 illustrates a co-sided contact type EAM with a capacitor integrated into an exemplary monolithic EAM chip. The exemplary EAM chip has a semi-insulating substrate 1600. Semiconducting n+ doped layer 400' is provided on substrate 1600. Active region 402 is disposed on n+ doped layer 400' and surrounded by insulating regions 604. Conductive n contacts 602 for n+ layer 400' are provided through gaps in insulating regions 604. A p+ doped semiconducting region 404 is disposed over active region 402. Conducting p contact 406 is provided on p+ region 404. A capacitor is formed integrally on semi-insulating substrate 1600. The capacitor has first plate 414, dielectric layer 412, and second plate 416. In this exemplary embodiment, second plate 416 extends beyond the dielectric 412 to provide a contact region. A connection to ground may be provided on this contact region. Insulator 1602 separates the EAM from the capacitor. Conductive material 606, disposed over insulator 1602, joins n contact 602 to EAM-side capacitor plate 414. Conductive material 606 is shown as a deposited conductor, but it is contemplated that conductive material 606 may alternatively be conductive epoxy or may be a ribbon bond. If conductive material 606 is a ribbon bond, insulator 1602 may be omitted. First plate 414 is electrically connected to a DC voltage supply (not shown).

Figure 17:
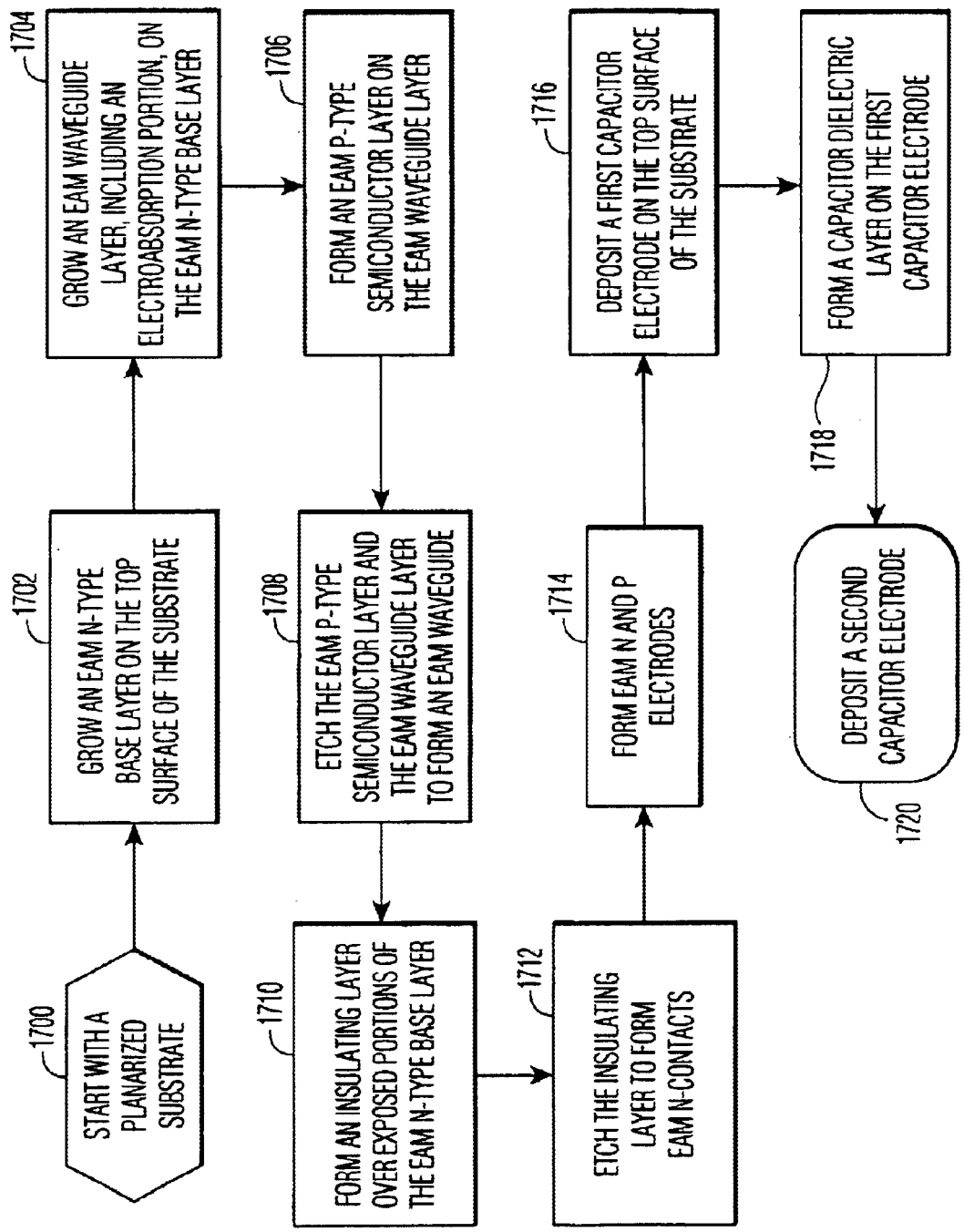
FIG. 17 is a flowchart illustrating an exemplary method of manufacture of the exemplary monolithic co-sided contact type EAM chip with bias capacitor of FIG. 16.

FIG. 17 is a flowchart illustrating fabrication steps for an exemplary monolithic EAM chip with a co-sided contact type EAM. FIGS. 18–24 illustrate various steps in this exemplary fabrication process.

Figure 18:
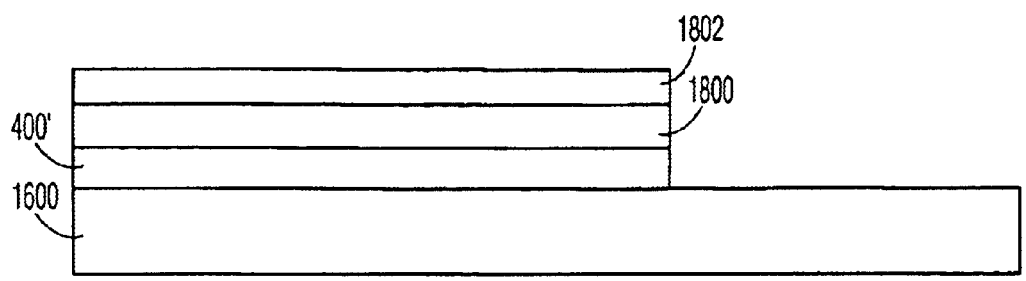
FIGS. 18, 19, 20, 21, 22, 23, and 24 are side plan drawings of an exemplary monolithic co-sided contact type EAM chip with bias capacitor during manufacture according to the flowchart of FIG. 17.

First, a semi-insulating substrate, element 1600 in FIG. 18, is provided, step 1700. The substrate may be a single layer intrinsic semi-insulator material, preferably a III/V composition such as GaAs, InP, InGaAsP, AlGaAs, or InSb. The substrate may serve several functions in the exemplary monolithic EAM chip, including mechanical support and acting as a thermal conductor to aid with temperature control.

An n-type base layer for the EAM, element 400' in FIG. 18, is formed on top of the semi-insulating substrate, step 1702. The n-type base layer is desirably formed of an n+-doped semiconductor that is lattice matched to the material of the semi-insulating substrate. The n-type base layer may, desirably, be grown by an epitaxial technique.

An active layer or EAM waveguide layer, including an electroabsorption portion, element 1800 of FIG. 18, is formed on top of the n-type base layer 400', step 1704. The active layer 1800 may be either a quantum well structure or a bulk material and is desirably formed of III/V materials selected to form a heterojunction with the n-type base layer. The active layer may, for example, be grown by an epitaxial technique.

A p-type semiconductor layer, element 1802 in FIG. 18, is then formed, step 1706. FIG. 18 illustrates the exemplary monolithic EAM chip at this step in fabrication. The p-type semiconductor layer may be formed of a III/V material similar to the material of the n-type base layer and forms a second heterojunction with the EAM waveguide. The material composition of this layer also desirably provides a lower index of refraction and a wider band gap than the EAM waveguide to improve the performance of the EAM. The semiconducting p+ doped layer preferably may be grown by an epitaxial technique such as LPE, MOCVD, MBE, or CBE, similar to the techniques used to form the EAM waveguide layer. Using the same growth method for both of these layers may be desirable to simplify manufacture, but it is not necessary.

Figure 19:
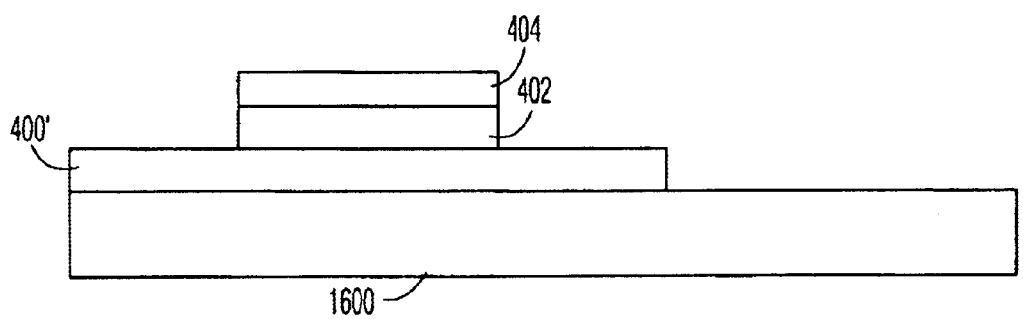

The p-type semiconductor layer and the active layer are then etched, step 1708, to form the p-type semiconductor region and the EAM waveguide (i.e. the active region of the monolithic EAM chip), elements 404 and 402, respectively, in FIG. 19. Although any standard semiconductor etching technique may be employed, a dry anisotropic etching technique may be desirable. The exact geometry of the EAM waveguide depends on the specific optical mode and carrier distribution desired. FIG. 19 illustrates the device at this step in the fabrication.

Figure 20:
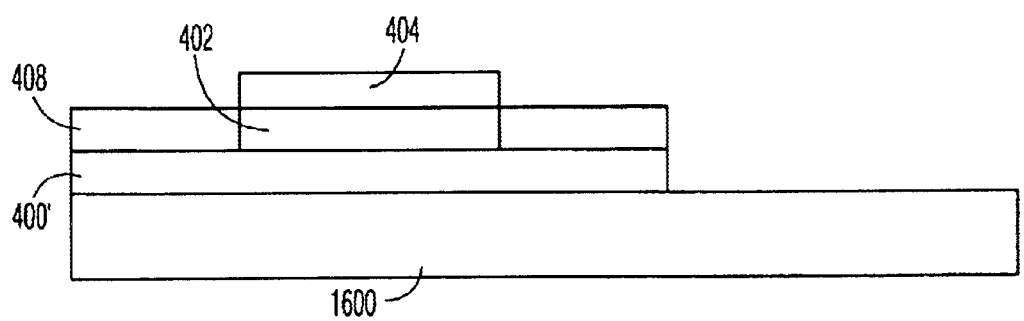

The insulating layer, element 408 in FIG. 20, may be formed over exposed portions of the n-type base layer and the side walls of the EAM waveguide and the passivation layer, step 1710. The insulating layer may be formed of insulating or semi-insulating material, such as SiO2, SiN, polyimide, alumina, or another insulating material using sputtering, evaporation, or other standard deposition techniques. It may be desirable for the insulating layer to be formed of an intrinsic III/V material by the same epitaxial method as was used to form the waveguide layer in step 1704. The material composition of this layer also desirably provides a lower index of refraction than the index of refraction of the EAM waveguide, thereby ensuring significant optical confinement within the EAM waveguide for an optical signal at the selected wavelength. FIG. 20 illustrates the exemplary monolithic EAM chip at this stage of fabrication.

Figure 21:
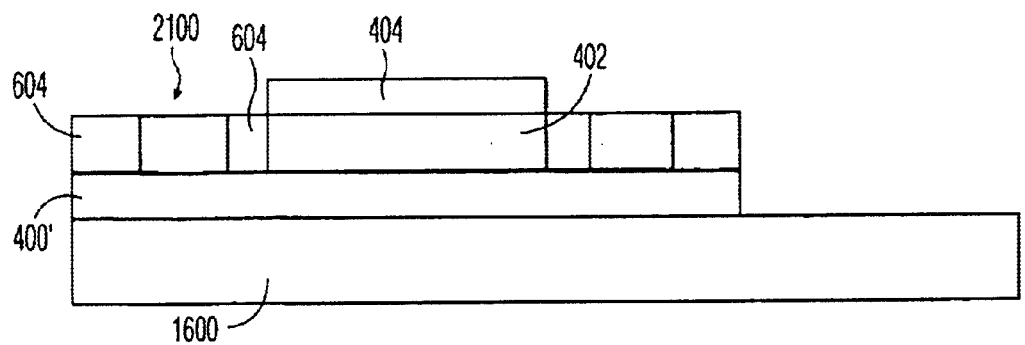

The insulating layer is etched to expose portions of the n-type base layer, forming gaps 2100 in the insulating layer, step 1712. The remaining portions of the insulating layer form insulating regions 604. Although any standard semiconductor etching technique may be employed, a dry anisotropic etching technique may be desirable. FIG. 21 illustrates the exemplary monolithic EAM chip at this stage of fabrication.

Figure 22:
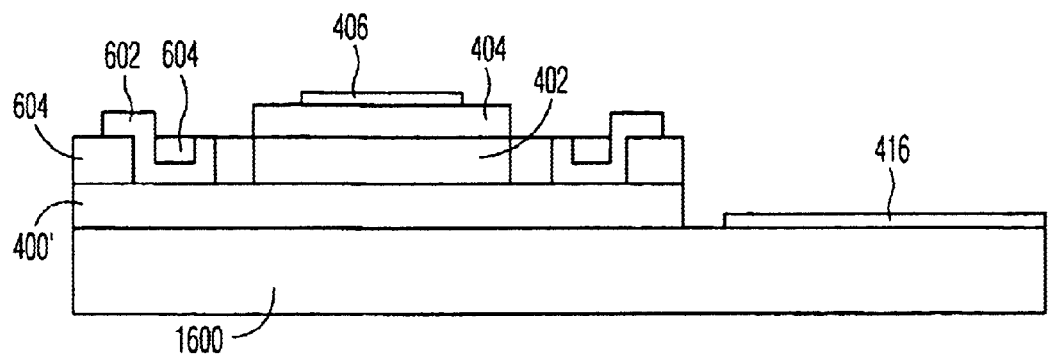

An EAM p contact, element 406 in FIG. 22, may be formed on semiconducting p+ doped region and EAM n contacts, element 602 in FIG. 22, may be formed on the exposed portions of the n-type base layer, step 1714. These EAM contacts may be formed from a conductive material using a standard deposition technique such as sputtering or evaporation. Patterning of the EAM contacts may be achieved by masking or etching. Although FIG. 22 illustrates the EAM contacts as adhering to the insulating layer, it is contemplated that slightly smaller EAM contacts may alternatively be formed and patterned by selecting a conductive material that does not adhere to the material of the insulating layer.

An EAM protection layer (not shown) may be formed over the EAM at this point in the fabrication. This EAM protection layer may be formed of SiO2, SiN, polyimide, or another insulating material using sputtering, evaporation, or other standard deposition techniques. The EAM protection layer may be patterned to desirably expose portions of semi-insulating substrate 1600 for formation of the capacitor. If an EAM protection layer is formed, it may be etched to form insulator 1602, as shown in FIG. 16, and expose EAM p contact 406 and EAM n contacts 602, following the formation of the capacitor. Although any standard semiconductor etching technique may be employed, a dry anisotropic etching technique may be desirable.

A non-EAM-side capacitor electrode, element 416 in FIG. 22, is deposited on the top surface of the semi-insulating substrate, step 1716 using a standard deposition technique such as sputtering or evaporation. Non-EAM-side capacitor electrode 416 is preferably formed from a conductive material. FIG. 22 illustrates the exemplary monolithic EAM chip at this stage of fabrication.

Figure 23:
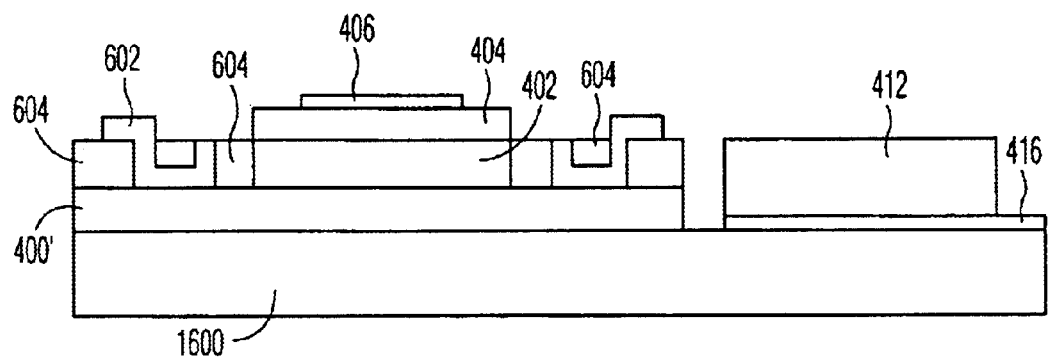

The capacitor dielectric layer is formed, step 1718, preferably using a thin film deposition technique. A thin film, including a dielectric, such as $SiO_x$, $SiN_x$, $BaTiO_3$, $SrTiO_3$, $TiO_2$, $Nb_2O_5$, CoO, $BaZrO_3$, $PbZrO_3$, $BaSnO_3$, $PbSnO_3$, borosilicate glass frit, polyimide, EIA Standard 198 code X7R, Z5U, or Y5V dielectrics, or combinations thereof, is deposited on the EAM-side capacitor electrode. FIG. 23 illustrates the exemplary monolithic EAM chip at this stage of fabrication.

Figure 24:
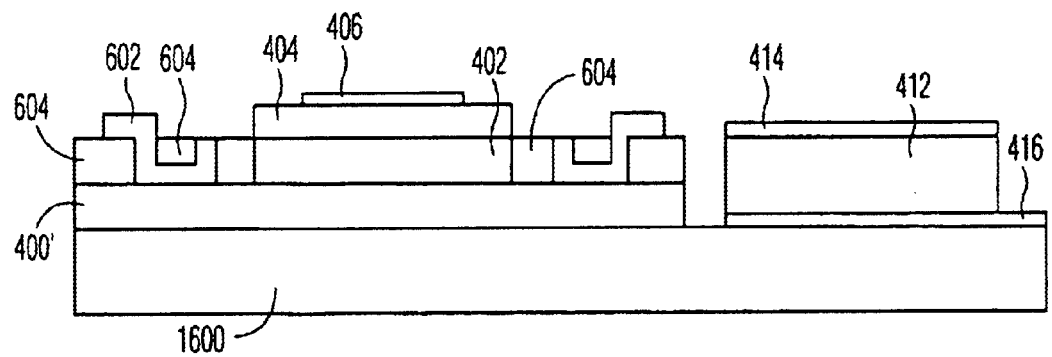

The EAM-side capacitor electrode, element 414 in FIG. 24, is then formed on the dielectric layer, step 1720 and is preferably formed of the same conductive material as the non-EAM-side capacitor electrode. FIG. 16 illustrates a completed monolithic EAM chip formed by the exemplary process of the flowchart of FIG. 17.

Figure 25:
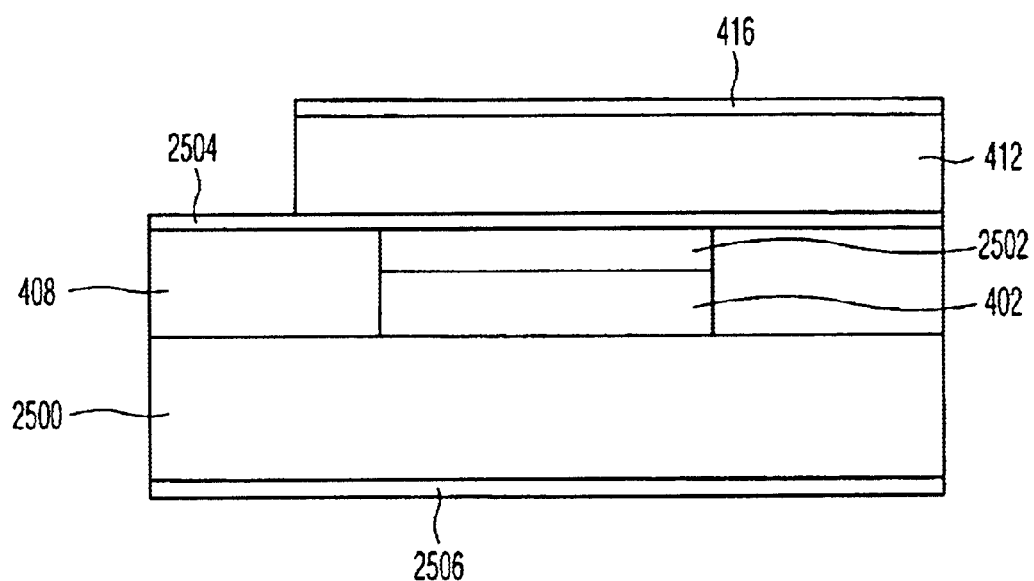
FIG. 25 is a side plan drawing of an exemplary monolithic EAM chip with bias capacitor.

FIG. 25 illustrates an EAM with a capacitor integrated into an exemplary monolithic EAM chip. The exemplary EAM chip has the capacitor integrated on top of the EAM and the EAM is formed on semiconducting p+ doped substrate. Conductive p contact 2506 may be provided on the bottom surface of p+ doped substrate 2500. Conductive p contact 2506 may, desirably, be connected via a transmission line (not shown) to a variable voltage source (not shown). Active region 402 is disposed on p+ doped substrate 2500 and surrounded by insulating layer 408. Semiconducting n+ doped region 2502 is disposed over active region 402. Active region 402 and semiconducting n+ doped region 2502 are surrounded by insulating layer 408. Conducting layer 2504 is provided on n+ doped region 2502 and may also be provided on a portion of insulating layer 408. Conducting layer 2504 functions as both the n contact of the EAM and as the EAM-side capacitor plate. The capacitor further includes dielectric layer 412 and second plate 416. In this exemplary embodiment, conducting layer 2504 extends beyond dielectric layer 412 to provide a contact region. A connection to ground may be provided to non-EAM-side capacitor plate 416 and conducting layer 2504 may be electrically connected to a DC voltage supply (not shown).

Figure 26:
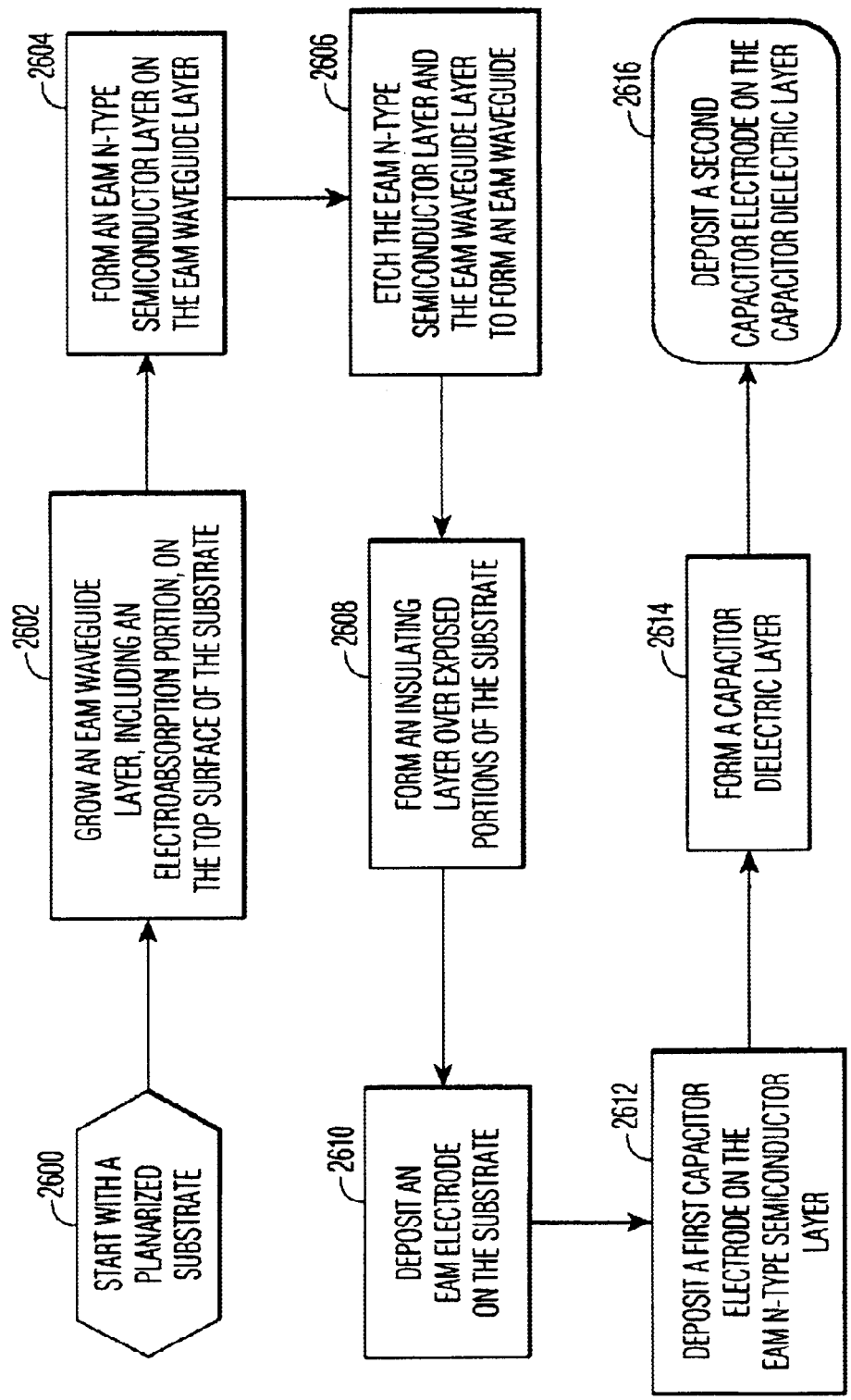
FIG. 26 is a flowchart illustrating an exemplary method of manufacture of the exemplary monolithic EAM chip with bias capacitor of FIG. 25.

FIG. 26 is a flowchart illustrating fabrication steps for an exemplary monolithic EAM chip with a top mounted capacitor, as shown in FIG. 25. FIGS. 27–30 illustrate various steps in this exemplary fabrication process.

Figure 27:
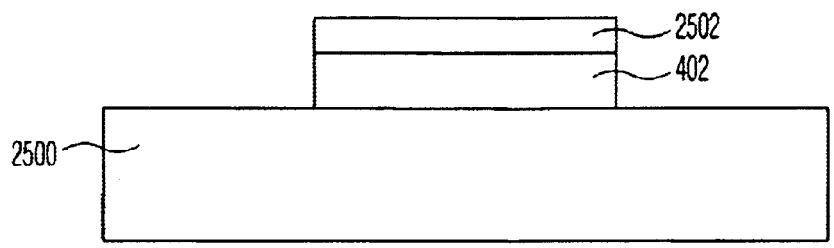
FIGS. 27, 28, 29, and 30 are side plan drawings of an exemplary monolithic EAM chip with bias capacitor during manufacture according to the flowchart of FIG. 26.

First, a p+ doped substrate, element 2500 in FIG. 27, is provided, step 2600. The substrate may be a single layer p+ doped semiconductor material, preferably a III/V composition such as GaAs, InP, InGaAsP, AlGaAs, or InSb.

An active layer or EAM waveguide layer 402, including an electroabsorption portion is formed on top of the p+ doped substrate, step 2602. The active layer which is formed may be either a quantum well structure or a bulk material and is desirably formed of III/V materials selected to form a heterojunction with the p+ doped substrate. The active layer may, for example, be grown by an epitaxial technique.

An n-type semiconductor layer 2502 is then formed, step 2604. The n-type semiconductor layer may be formed of an n+ doped III/V material similar to the material of the substrate layer and forms a second heterojunction with the EAM waveguide. The material composition of this layer also desirably provides a lower index of refraction and a wider band gap than the EAM waveguide to improve the performance of the EAM. The n-type semiconductor layer preferably may be grown by an epitaxial technique such as LPE, MOCVD, MBE, or CBE, similar to the techniques used to form the EAM waveguide layer. Using the same growth method for both of these layers may be desirable to simplify manufacture, but it is not necessary.

The n-type semiconductor layer 2502 and the active layer 402 are then etched, step 2606, to form the semiconducting n+ doped region and the EAM waveguide (i.e. the active region of the monolithic EAM chip), elements 2502 and 402, respectively, in FIG. 27. Although any standard semiconductor etching technique may be employed, a dry anisotropic etching technique may be desirable. FIG. 27 illustrates the exemplary monolithic EAM chip at this stage of fabrication.

Figure 28:
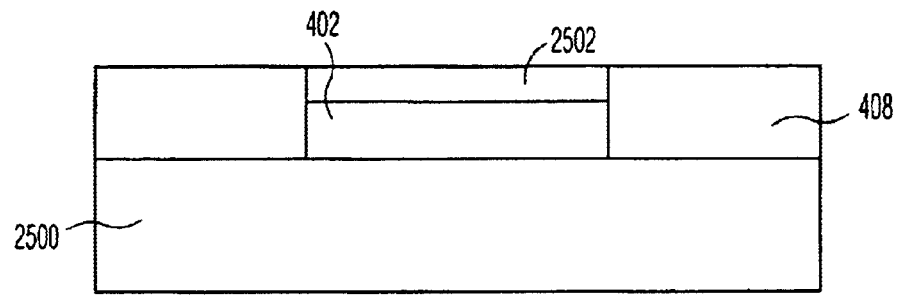

The insulating layer, element 408 in FIG. 28, may be formed over exposed portions of the p+ doped substrate and the side walls of the EAM waveguide and passivation, step 2608. FIG. 28 illustrates the exemplary monolithic EAM chip at this stage of fabrication.

Figure 29:
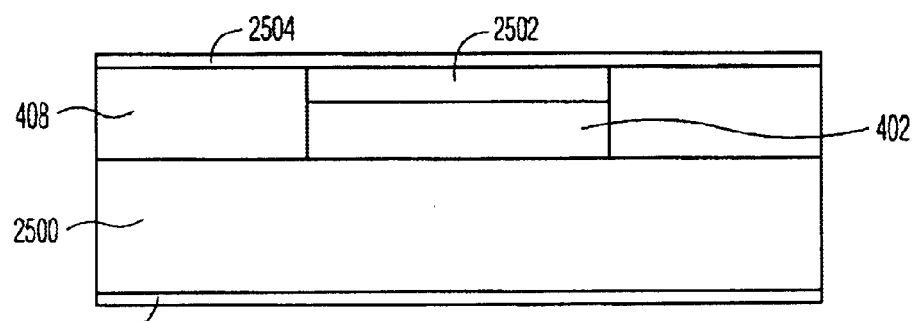

An EAM p contact, element 2506 in FIG. 29, is formed on semiconducting p+ doped substrate, step 2610. A conducting layer, element 2504 in FIG. 29, is formed on semiconducting n+ doped region 2502 (and possibly a portion of insulating layer 408), step 2612. The EAM p contact and the conducting layer may be formed from a conductive material using a standard deposition technique such as sputtering or evaporation. FIG. 29 illustrates the exemplary monolithic EAM chip at this stage of fabrication.

Figure 30:
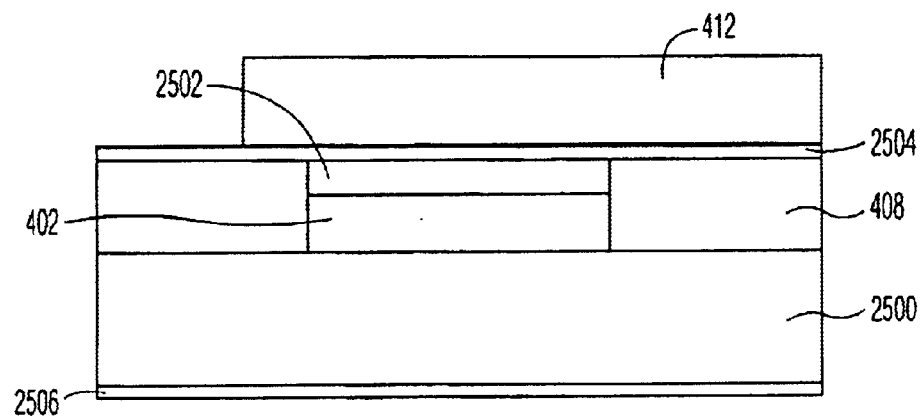

The conducting layer, element 2504 in FIG. 30, is both the EAM n contact and the EAM-side capacitor electrode. The capacitor dielectric layer, element 412 in FIG. 30, is formed, step 2614, on the conducting layer 2504. FIG. 30 illustrates the exemplary monolithic EAM chip at this stage of fabrication. The capacitor dielectric layer may be formed using a thin film deposition technique, as described above. Alternatively, it may be desirable to form the capacitor dielectric layer of a thin layer of non-conducting epoxy or thermoplastic material. A small quantity of the epoxy or thermoplastic may be applied to the conducting layer as viscous liquid. The viscous liquid may be spread in thin layer over the desired portion of the conducting layer and allowed to cure into a solid material. It is contemplated that this method of forming a dielectric layer may be used with any embodiments of the present invention.

The non-EAM-side capacitor electrode, element 416 in FIG. 25, is formed on the dielectric layer, step 2616 and may be formed of the same conductive material as the EAM-side capacitor electrode. For an epoxy or a thermoplastic dielectric layer, a conductive epoxy may be desirable to form the non-EAM-side capacitor electrode. FIG. 25 illustrates a completed monolithic EAM chip formed by the exemplary process of the flowchart of FIG. 26.

While the invention has been described with respect to particular embodiments, those of ordinary skill in the art will appreciate variations in structure and substitutions of materials that are within the scope and spirit of the invention.

What is claimed:

1. Drive circuitry to provide a DC bias voltage and a high frequency modulation current to an electroabsorption modulator (EAM) which includes a first semiconductor type contact and a second semiconductor type contact, the drive circuitry comprising:

a first modulation lead configured to be coupled to the first semiconductor type contact of the EAM; and a second modulation lead configured to be coupled to an AC ground;

a coupling capacitor including;

an EAM-side capacitor electrode electrically coupled to the second semiconductor type contact of the EAM;

a non-EAM-side capacitor electrode electrically coupled to the AC ground; and a dielectric layer disposed between the EAM-side capacitor electrode and the non-EAM-side capacitor electrode; and a first DC lead electrically coupled to the EAM-side capacitor electrode and configured to be coupled to a first DC potential.

2. The drive circuitry of claim 1, further comprising:

a termination circuit including;

a first termination electrode electrically coupled to the first semiconductor type contact of the EAM;

a second termination electrode configured to be coupled to a second DC potential; and a resistive layer disposed between the first termination electrode and the second termination electrode.

3. The drive circuitry of claim 1, wherein the AC ground includes a common potential.

4. The drive circuitry of claim 1, wherein:

the first semiconductor type contact of the EAM is an n contact; and the second semiconductor type contact of the EAM is a p contact.

5. The drive circuitry of claim 1, wherein:

the first semiconductor type contact of the EAM is a p contact; and the second semiconductor type contact of the EAM is an n contact.

* * * * *